United States Patent Office 3,325,500
Patented June 13, 1967

3,325,500
MONO- AND BIS-[(1-PIPERIDYL)-LOWER-ALKYL]AMINES
Bernard L. Zenitz, Colonie, and Alexander R. Surrey, Albany, N.Y., assignors to Sterling Drug Inc., New York, N.Y., a corporation of Delaware
No Drawing. Filed Feb. 15, 1965, Ser. No. 432,845
5 Claims. (Cl. 260—294)

This application is a continuation-in-part of our prior application Ser. No. 129,995, filed Aug. 8, 1961, and now abandoned.

This invention relates to primary, secondary, and tertiary (1-piperidyl)-lower-alkylamines, their acid-addition salts, and to processes for the preparation thereof. Said amines have utility as chemotherapeutic and pharmacodynamic agents of a nature to be more fully described hereinafter. The primary and secondary amines have further utility as intermediates in the preparation of certain 2- and 4-[(1-piperidyl)-lower-alkylamino]quinolines, and 2- and 4-{N,N-bis-[(1-piperidyl)-lower alkyl] amino} quinolines which are described and claimed in our copending parent application S.N. 129,995, filed Aug. 8, 1961, of which the instant application is a continuation-in-part.

The compounds of the instant invention are represented by the formula:

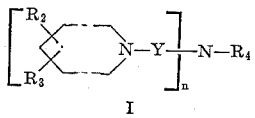

I wherein $R_2$ is a member of the group consisting of unsubstituted-carbamyl, N-lower-alkylcarbamyl, N,N-di-lower-alkylcarbamyl, piperidinocarbonyl, pyrrolidinocarbonyl, hydroxy, hydroxy-lower-alkyl, lower-alkanoylamino, phenyl-lower-alkyl, and cyclo-alkyl-lower-alkyl; $R_3$ is a member of the group consisting of hydrogen and from one to five lower-alkyl radicals; $R_4$ is a member of the group consisting of hydrogen, benzoyl, benzyl, phenyl-lower-alkanoyl, phenyl-lower-alkyl, lower-alkanoyl, halo-lower-alkanoyl, lower-alkyl, cycloalkanecarbonyl, cycloalkyl-lower-alkanoyl, cycloalkyl-lower-alkyl, carboxy-cycloalkylcarbonyl, hydroxymethyl-cycloalkylmethyl, phenoxy-lower-alkanoyl, phenoxy-lower-alkyl, phenyl-lower-alkenoyl, carboxy-lower-alkanoyl, carbamyl, N-lower-alkylcarbamyl, N - cycloalkyl - carbamyl, N,N-di-lower-alkylcarbamyl, N - phenylcarbamyl, piperidinocarbonyl, pyrrolidinocarbonyl, thiocarbamyl, N-lower-alkylthiocarbamyl, N,N-di-lower-alkylthiocarbamyl, N-phenylthiocarbamyl, piperidinothiocarbonyl, pyrrolidinothiocarbonyl, hydroxy-lower-alkyl, cyano-lower-alkyl, phenylsulfonyl, amidino, amidoximino-lower-alkyl, and lower-alkyl-keto-lower-alkanoyl; Y is lower-alkylene containing from two to eight carbon atoms and interposing at least two carbon atoms between the amino nitrogen atom of the (1-piperidyl)-lower-alkylamino group and the ring nitrogen atom of the piperidine nucleus; and $n$ is the integers 1 and 2, the third valence on the amino nitrogen atom being attached to a hydrogen atom when $n$ is 1. The variable $R_4$ in the compounds of Formula I above can also be a divalent radical joining two of the groupings:

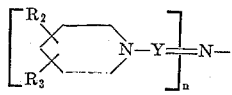

together (hereinafter referred to as (1-piperidyl)-lower-alkyl-amino radicals), including a divalent residue of a dibasic carboxylic acid, CO-Y'''-CO where Y''' is a single bond or lower-alkylene containing from one to four carbon atoms, e.g., —COCO— (from oxalic acid), —COCH$_2$CH$_2$CO— (from succinic acid), a lower-alkylene group Y'''', containing from one to six carbon atoms, i.e., 1,2-ethylene, 1,4-butylene, 1-6-hexylene, and the like, or dicarbamylbiphenyl, i.e.,

CONH—C$_6$H$_4$—C$_6$H$_4$—NHCO

The compounds of Formula I where $R_4$ is a hydrogen atom are useful as intermediates for the preparation of 2- and 4-[(1-piperidyl)-lower-alkylamino]quinolines and 2- and 4-{N,N-bis-[(1-piperidyl)-lower-alkyl]amino} quinolines having the formulas:

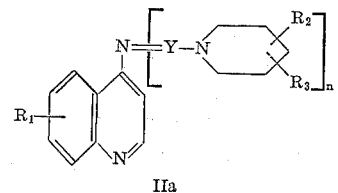

IIa and

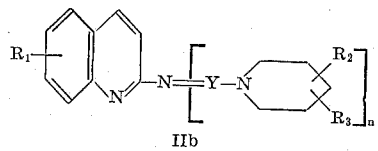

IIb where $R_1$ is a member of the group consisting of hydrogen, halogen (including fluorine, chlorine, bromine, and iodine), lower-alkoxy, hydroxy, monocarbocyclic aryl-lower - alkoxy, trifluoromethyl, lower - alkylmercapto, lower-alkylsulfinyl, and lower-alkylsulfonyl, and $R_2$, $R_3$, Y, and $n$ have the meanings given above. The preparation of the compounds of Formulas IIa and IIb from the compounds of Formula I is effected by reacting the compounds of Formula I where $R_4$ is a hydrogen atom with a 2- or 4-haloquinoline. The reaction is carried out at a temperature in the range from about 75° C. to about 150° C. and can be carried out either with or without the use of a solvent. Suitable solvents are those that are inert under the conditions of the reaction, for example, lower-alkanols, e.g., methanol or isopropanol, and phenol. A preferred solvent is phenol.

In the above Formula I, when $R_2$ is hydroxy or lower-alkanoylamino, said radicals can occupy either the 3- or 4-positions of the piperidine ring. When $R_2$ is unsubstituted-carbamyl, N-lower-alkylcarbamyl, N,N-di-lower-alkylcarbamyl, piperidinocarbonyl, pyrrolidinocarbonyl, hydroxy-lower-alkyl, phenyl-lower-alkyl, or cycloalkyl-lower-alkyl, said radicals can occupy any of the three available positions on the piperidine ring.

When $R_2$ or $R_4$ is hydroxy-lower-alkyl, the said group can be straight or branched and can contain from one to about six carbon atoms. $R_2$ and $R_4$ thus stand, inter alia, for hydroxymethyl, 1-hydroxyethyl, 2-hydroxyethyl, 3-hydroxypropyl, 4-hydroxybutyl, 3-hydroxybutyl, 5-hydroxypentyl, 6-hydroxyhexyl, and the like.

When $R_2$ is lower-alkanoylamino or when $R_4$ is lower-alkanoyl or halo-lower-alkanoyl, the lower-alkanoyl portion of said radicals can be either straight or branched and can contain from one to about six carbon atoms. $R_2$ thus also stands, inter alia, for formylamino, acetylamino, propionylamino, α-ethylbutyrylamino, and the like, and R₄ stands, inter alia, for formyl, acetyl, α-chloroacetyl, α-bromoacetyl, α,α-dichloroacetyl, propionyl, α-chloropropionyl, butyryl, α-chlorobutyryl, and the like.

When $R_2$ or $R_4$ is N-lower-alkylcarbamyl or N,N-di-lower-alkylcarbamyl, or when $R_4$ is N-lower-alkylthiocarbamyl or N,N-di-lower-alkylthiocarbamyl, the alkyl moiety in each of said radicals can contain from one to about four carbon atoms and can be either straight or branched. Thus $R_2$ and $R_4$ also stand, inter alia, for N-methylcarbamyl, N-ethylcarbamyl, N-butylcarbamyl, N,N-dimethylcarbamyl, N,N-diethylcarbamyl, N,N-dibutylcarbamyl, and $R_4$ stands, inter alia, for N-methylthiocarbamyl, N-ethylthiocarbamyl, N-butylthiocarbamyl, N,N-dimethylthiocarbamyl, N,N-diethylthiocarbamyl, N,N-dibutylthiocarbamyl, and the like.

When $R_2$ or $R_4$ is phenyl-lower-alkyl or when $R_4$ is benzoyl, benzyl, phenyl-lower-alkanoyl, phenyl-lower-alkenoyl, N-phenylcarbamyl, N-phenylthiocarbamyl, phenylsulfonyl, phenoxy-lower-alkanoyl, or phenoxy-lower-alkyl, the benzene ring thereof can be unsubstituted or can bear one or more substituents of low molecular weight and of such nature that they do not interfere with or take part in the reaction. Examples of such substituents include lower-alkyl, halo, lower-alkoxy, lower-alkylmercapto, lower-alkylsulfonyl, trifluoromethyl, sulfamoyl, methylenedioxy, benzyloxy, nitro, cyano, carboxy, hydroxy, lower-alkanoyloxy, lower-alkanoylamino, amino, di-lower-alkanoylamino, and the like.

When $R_2$ or $R_4$ is phenyl-lower-alkyl, or when $R_4$ is pehnoxy-lower-alkyl, phenoxy-lower-alkanoyl, phenyl-lower-alkanoyl, or phenyl-lower-alkenoyl, the lower-alkyl or lower-alkanoyl moieties thereof contain from one to five carbon atoms, and the lower-alkenoyl moiety thereof contains from three to five carbon atoms, and in either case can be straight or branched.

When $R_2$ or $R_4$ is cycloalkyl-lower-alkyl or when $R_4$ is cycloalkanecarbonyl, cycloalkyl-lower-alkanoyl, carboxycycloalkylcarbonyl, hydroxymethyl-cycloalkylmethyl, or N-cycloalkylcarbamyl, the cycloalkyl moiety thereof contains from three to seven ring carbon atoms, and the lower-alkyl or lower-alkanoyl moieties thereof contain from one to five carbon atoms and can be straight or branched. Thus the cycloalkyl-lower-alkyl radical includes such radicals as cyclopropylmethyl, cyclopropylcarbonyl, cyclobutylmethyl, cyclobutylcarbonyl, cyclopentylmethyl, cyclohexylmethyl, cyclohexylcarbonyl, 2-carboxycyclohexanecarbonyl, 2-(cyclohexyl)ethyl, β-cyclohexylpropionyl, 5-(cyclohexyl)pentyl, cycloheptylmethyl, and the like.

In the above general Formula I, $R_3$ stands, inter alia, for hydrogen or from one to five lower-alkyl radicals. When $R_3$ is one or more lower-alkyl radicals, each lower-alkyl radical can contain from one to about four carbon atoms, can be straight or branched and can occupy any of the five available positions on the piperidine ring, and when $R_3$ is more than one lower-alkyl radical, said radicals can be the same or different and can occupy the same or different positions on the piperidine ring. Thus $R_3$ stands, inter alia, for methyl, ethyl, isopropyl, n-butyl, isobutyl, and the like.

When $R_4$ represents lower-alkyl, carboxy-lower-alkanoyl, cyano-lower-alkyl, amidoximino-lower-alkyl, or lower-alkyl-keto-lower-alkanoyl, the lower-alkanoyl or lower-alkyl moieties thereof contain from one to eight carbon atoms and can be straight or branched. Thus $R_4$ also represents, inter alia, methyl, ethyl, propyl, isobutyl, heptyl, succinoyl, glutaryl, 2-cyanoethyl, 3-cyanpropyl, 3-amidoximinopropyl, 4-amidoximinobutyl, 2-ketopropyl, 3-ketobutyl, and the like.

In the above general Formula I, Y is lower-alkylene containing from two to eight carbon atoms and interposing at least two carbon atoms between the amino nitrogen atom of the (1-piperidyl)-lower-alkylamino group and the ring nitrogen atom of the piperidine nucleus. The lower-alkylene group can be straight or branched and thus stands, inter alia, for 1,2-ethylene [—CH₂CH₂—], 1,3-propylene [—(CH₂)₃—], 1,2-(2-methylethylene)

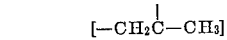

1,4-butylene [—(CH₂)₄—], 1,5-pentylene [—(CH₂)₅—], 1,6-hexylene [—(CH₂)₆—], 1,7-heptylene [—(CH₂)₇—], 1,8-octylene [—(CH₂)₈—], and the like.

The mono- and bis-[(1-piperidyl)-lower-alkyl]amines of Formula I where $R_4$ is H are prepared by reducing, with hydrogen in the presence of a catalyst, a 1-(cyano-lower-alkyl)-piperidine having the formula

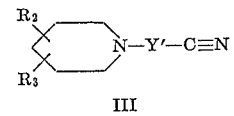

III where $R_2$ and $R_3$ have the meanings given above; and Y' is lower-alkylene containing from one to seven carbon atoms and interposing at least one carbon atom between the ring nitrogen atom of the piperidine nucleus and the cyano group. As will be described hereinafter, the compounds of Formula III have further utility other than as intermediates, and when not used as intermediates, the group $R_2$, in compounds of Formula III, represents in addition certain carbo-lower-alkoxy groups of a nature to be more fully described hereinafter. These latter compounds are also considered to be within the purview of the invention.

The reduction of the compounds of Formula III is carried out in an organic solvent inert under the conditions of the reaction, for example, methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis-[(1-piperidyl)-lower-alkyl]amines of Formula I (n is 2, $R_4$ is H) are the predominant products although the mono-[(1-piperidyl)-lower-alkyl]amines (n is 1, $R_4$ is H) are also produced in minor amounts. On the other hand, if the solvent used is first saturated with anhydrous ammonia, so that the reaction medium is strongly ammoniacal, the predominant products are the mono-[(1-piperidyl)-lower-alkyl]amines, although the bis-[(1-piperidyl)-lower-alkyl]amines are also produced in minor amounts. Suitable catalysts are platinum oxide, palladium-on-charcoal, and rhodium-on-alumina. A preferred catalyst is rhodium-on-alumina.

The 1-(cyano-lower-alkyl)piperidines of Formula III where Y' is lower-alkylene interposing two carbon atoms between the cyano group and the ring nitrogen atom of the piperidine nucleus are prepared by reacting an acrylonitrile with a piperidine in the presence of a basic catalyst. The reaction is represented by the equation:

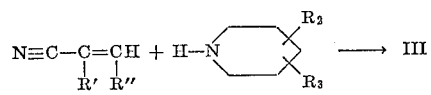

where $R_2$ and $R_3$ have the meanings given above and each of R' and R'' stands for hydrogen or the methyl radical, or one of R' and R'' is hydrogen while the other is the ethyl radical. The reaction is preferably carried out in an organic solvent inert under the conditions of the reaction, for example, water, benzene, dioxane, pyridine, or acetonitrile. A preferred solvent is water. Suitable basic catalysts are tri-lower-alkylamines, for example, triethylamine, or basic tertiary heterocyclic amines, for example pyridine, or quaternary ammonium hydroxides, for example Triton B® (benzyl trimethylammonium hydroxide). A preferred basic catalyst is triethylamine.

The compounds of Formula III where Y' is lower-alkylene interposing from one to seven carbon atoms between the cyano group and the ring nitrogen atom of the piperidine nucleus are prepared by reacting a cyano-lower-alkyl halide with an appropriately substituted-piperidine in the presence of an acid-acceptor. The reaction is preferably carried out in an organic solvent inert under the conditions of the reaction, for example, tetrahydrofuran, acetone, methanol, ethanol, isopropanol, and the like. The purpose of the acid-acceptor is to take up the hydrogen halide split out during the course of the reaction and is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the substituted-piperidine.

The compounds of Formula I where $R_4$ is benzoyl, phenyl-lower-alkanoyl, lower-alkanoyl, halo-lower-alkanoyl, cycloalkane-carbonyl, cycloalkyl-lower-alkanoyl, carboxy-cycloalkylcarbonyl, phenoxy-lower-alkanoyl, phenyl-lower-alkenoyl, carboxy-lower-alkanoyl, phenylsulfonyl, or a divalent residue of a dibasic carboxylic acid are prepared by reaction of the compounds of Formula I where $R_4$ is hydrogen with the corresponding acid halide. The reaction is preferably conducted in an organic solvent inert under the conditions of the reaction, for example, benzene, toluene, xylene, dioxane, and the like, and at a temperature in the range from 50° C. to 150° C. The reaction can if desired be carried out in the presence of an acid-acceptor to take up the hydrogen halide split out during the course of the reaction. Suitable acid-acceptors are alkali metal hydroxides, for example, sodium or potassium hydroxide, alkali metal carbonates or bicarbonates, for example, sodium or potassium carbonate or sodium or potassium bicarbonate, or an excess of the amine starting material.

Another method for preparing the compounds of Formula I where $R_4$ is benzoyl, lower-alkanoyl, cycloalkane-carbonyl, carboxy-cycloalkylcarbonyl, or a divalent residue or a dibasic carboxylic acid, and which can also be used to prepare the compounds of Formula I where $R_4$ is lower-alkyl-keto-lower-alkanoyl or carboxy-lower-alkanoyl comprises reacting the secondary amines of Formula I where $R_4$ is hydrogen with the corresponding acid anhydride. The reaction is preferably conducted in an organic solvent inert under the conditions of the reaction, for example, benzene, toluene, xylene, dioxane, and the like, and at a temperature in the range from 20° C. to 150° C. The reaction is preferably carried out in the presence of a basic catalyst for example, pyridine or triethylamine.

The compounds of Formula I where $R_4$ is β-phenylpropionyl are advantageously prepared from the corresponding N-cinnamoyl compounds ($R_4$ is cinnamoyl or substituted cinnamoyl), (which in turn are prepared by reaction of the secondary amine with a cinnamoyl halide as described above) by catalytic reduction of the cinnamamide with hydrogen. The compounds where $R_4$ is β-phenylpropionyl are produced when reduction is stopped after the uptake of one mole of hydrogen, and the compounds where $R_4$ is β-cyclohexylpropionyl are produced if the reduction is allowed to proceed to the uptake of four moles of hydrogen. The reaction is conducted in an organic solvent inert under the conditions of the reaction, for example, methanol, ethanol, propanol, and the like, and at hydrogen pressures in the range from 40 to 100 pounds p.s.i. Suitable catalysts are palladium-on-charcoal, platinum oxide and palladium oxide.

The compounds of Formula I where $R_4$ is benzyl, phenyl-lower-alkyl, lower-alkyl, cycloalkyl-lower-alkyl, hydroxymethylcycloalkylmethyl, phenoxy-lower-alkyl, hydroxy-lower-alkyl, or lower-alkylene are prepared by reducing, with an alkali metal aluminum hydride, the corresponding amides, i.e. the compounds where $R_4$ is, respectively, benzoyl, phenyl-lower-alkanoyl, lower-alkanoyl, cycloalkyl - lower-alkanoyl, carboxy-cycloalkylcarbonyl, phenoxy-lower-alkanoyl, carboxy-lower-alkanoyl, or a divalent residue of a dibasic carboxylic acid. The reaction is carried out at a temperature in the range from 0° C. to about 65° C. in an organic solvent inert under the conditions of the reaction, for example, dioxane, tetrahydrofuran, diethyl ether, dibutyl ether, and the like. A preferred reducing agent is lithium aluminum hydride.

An alternative procedure for preparing the compounds of Formula I where $R_4$ is methyl comprises reductive alkylation of the amines where $R_4$ is hydrogen with formaldehyde and formic acid using the Eschweiler-Clarke modification of the Leuckart reaction. The reaction is preferably conducted in an excess of formic acid as the solvent at the reflux temperature thereof.

Another method of preparing the compounds of Formula I where $R_4$ is benzyl comprises reacting the secondary amines of Formula I where $R_4$ is hydrogen with a benzyl halide. The reaction is preferably conducted in an organic solvent inert under the conditions of the reaction, for example, benzene, ethanol, methanol, and the like, at a temperature in the range from 50° C. to 150° C. The reaction is preferably carried out in the presence of an acid-acceptor to take up the hydrogen halide split out during the course of the reaction. Suitable acid-acceptors are alkali metal carbonates or bicarbonates, for example, sodium or potassium carbonate or sodium or potassium bicarbonate, or alkali metal hydroxides, for example, sodium or potassium hydroxide.

An alternative method for preparing the compounds of Formula I where $R_4$ is 2-hydroxyethyl comprises reacting the amines of Formula I where $R_4$ is hydrogen with ethylene oxide. The reaction is preferably conducted in an autoclave at temperatures in the range from 100 to 250° C. and in an organic solvent inert under the conditions of the reaction, for example, benzene, toluene, lower-alkanols, and the like.

The compounds of Formula I where $R_4$ is N-lower-alkylcarbamyl, N-lower-alkylthiocarbamyl, N-cycloalkylcarbamyl, N-phenylcarbamyl, N-phenylthiocarbamyl, carbamyl, thiocarbamyl, or dicarbamylbiphenyl comprises reacting the compounds of Formula I where $R_4$ is hydrogent with a lower-alkylisocyanate, lower-alkylisothiocyanate, cycloalkylisocyanate, phenylisocyanate, phenylisothiocyanate, isocyanic acid, isothiocyanic acid, or biphenyldiisocyanate, respectively. The reaction is preferably conducted in an organic solvent inert under the conditions of the reaction, for example, benzene, toluene, acetone, lower-alkanols, and the like. Reaction generally takes place at room temperature, although heating at the boiling point of the solvent may sometimes be desirable to effect reaction.

The compounds of Formula I where $R_4$ is cyano-lower-alkyl are prepared by reacting the compounds of Formula I where $R_4$ is hydrogen with a cyano-lower-alkyl halide in the presence of an acid-acceptor and at temperatures in the range from 50 to 150° C. The reaction is preferably carried out in an organic solvent inert under the conditions of the reaction, for example, methanol, ethanol, benzene, toluene, and the like. The purpose of the acid-acceptor is to take up the hydrogen halide which is split out during the course of the reaction and can be any basic substance which forms water-soluble salts easily separable from the reaction mixture. Suitable acid-acceptors are alkali metal hydroxides, for example, sodium or potassium hydroxide, alkali metal carbonates or bicarbonates, for example, sodium or potassium carbonate or sodium or potassium bicarbonate, and the like.

Alternatively the compounds of Formula I where $R_4$ is 2-cyanoethyl can be prepared by reacting the compounds of Formula I where $R_4$ is hydrogen with acrylonitrile. The reaction is carried out in an organic solvent inert under the conditions of the reaction, for example, benzene, toluene, methanol, acetone, and the like. It is preferred to conduct the reaction in an excess of the acrylonitrile at the boiling point thereof.

The compounds of Formula I where $R_4$ is amidoximino-lower-alkyl are prepared from the compounds where $R_4$ is the corresponding cyano-lower-alkyl group by reacting the latter with hydroxylamine in the presence of a basic catalyst, for example, sodium carbonate, in an organic solvent inert under the conditions of the reaction, for example, methanol, ethanol, isopropanol, and the like, and at a temperature in the range from 50 to 100° C. A preferred solvent is ethanol.

The compounds of Formula I where $R_4$ is amidino are prepared by reacting the compounds of Formula I where $R_4$ is hydrogen with a 2-lower-alkyl-2-thio-pseudourea. The reaction is carried out at a temperature in the range from 20 to 100° C. and in an organic solvent inert under the conditions of the reaction, for example, methanol, ethanol, isopropanol, acetone, and the like.

The compounds of Formula where $R_4$ is N, N-di-lower-alkylcarbamyl, N,N-di-lower-alkylthiocarbamyl, piperidinocarbonyl, pyrrolidinocarbonyl, piperidinothiocarbonyl, or pyrrolidinothiocarbonyl are prepared by reacting the compounds of Formula I where $R_4$ is hydrogen with an N,N-di-lower-alkylcarbamyl chloride, N,N-di-lower-alkythiocarbamyl chloride, piperidinocarbonyl chloride, pyrrolidinocarbonyl chloride, piperidinothiocarbonyl chloride, or pyrrolidinothiocarbonyl chloride, respectively. The reaction is preferably carried out in the presence of an acid-acceptor and in an organic solvent inert under the conditions of the reaction, for example, benzene, toluene, acetone, and the like. The purpose of the acid-acceptor is to take up the hydrogen halide which is split out during the course of the reaction and can be any basic substance which forms water-soluble salts easily separable from the reaction mixture. Suitable acid-acceptors are for example, alkali metal carbonates or bicarbonates such as sodium or potassium carbonate or sodium or potassium bicarbonate.

The novel compounds of the instant invention are the compounds of Formula I and their acid-addition salts. The compounds of Formula I, in free base form, are converted to the acid-addition salt form by interaction of the base with an acid. In like manner, the free bases can be regenerated from the acid-addition salt form in the conventional manner, that is, by treating the salts with strong aqueous bases, for example, alkali metal hydroxides, alkali metal carbonates, and alkali metal bicarbonates. The bases thus regenerated can then be interacted with the same or a different acid to give back the same or a different acid-addition salt. Thus the novel bases and all their acid-addition salts are readily interconvertible.

It will thus be appreciated that Formula I not only represents the structural configuration of the bases of the invention but is also representative of the structural entity which is common to all of our compounds of Formula I, whether in the form of the free bases or in the form of the acid-addition salts of the bases. We have found that by virtue of this common structural entity, the bases and their acid-addition salts have inherent pharmacodynamic and chemotherapeutic activity of a type to be more fully described hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new mono- and bis-[(1-piperidyl)-lower-alkyl] amines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids; such as found, for example, in Beilstein's Organische Chemie, 4th ed., volumes III, IV, IX, X, XIV, XVII, XIX, XXI, XXII, XXV; organic mono- and poly-sulfonic and -sulfinic acids; such as found, for example, in Beilstein volumes VI, XI, XVI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic; sulfonic, and sulfinic acids such as found, for example, in Beilstein volumes XVIII, XXII, and XXV; acidic ion-exchange resins, for example, Amberlite® XE–66 resin; and inorganic acids of any acid-forming element or combination of elements, such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties, but which are not generally considered as acids in the same sense as carboxylic or sulfonic acids. are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example, boron trifluoride.

Thus appropriate acid-addition salts are those derived from such diverse acids as formic acid, acetic acid, isobutyric acid, alpha-mercaptopropionic acid, malic acid, fumaric acid, succinic acid, tartaric acid, citric acid, lactic acid, benzoic acid, 4-methoxybenzoic acid, phthalic acid, anthranilic caid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I have shown that they possess pharmacodynamic and chemotherapeutic properties, in particular, anti-inflammatory, coronary dilator, hypotensive, anti-fungal, anthelmintic, and psychomotor depressant activities thus indicating their usefulness as anti-inflammatory, anti-fungal and blood pressure lowering agents, coronary dilators, anthelmintics, and tranquilizers.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

*1-(2-cyanoethyl)-4-carbamylpiperidine* [III: $R_2$ is 4-$CONH_2$; $R_3$ is H; Y' is $CH_2CH_2$]

To a solution of 18.82 g. (0.10 mole) of 4-carbamylpiperidine acetate and 13.11 g. (0.11 mole) of triethylamine in 125 ml. of water in a 250 ml. three-necked flask equipped with a stirrer, a thermometer, and a dropping funnel was added dropwise, over a period of one hours, 5.58 g. (0.11 mole) of acrylonitrile while maintaining the temperature between 14 and 20° C. The mixture was allowed to warm to room temperature, stirred for an additional hour and allowed to stand overnight at room temperature. The mixture was then treated with 40 g. of solid potassium carbonate and the mixture extracted with chloroform. The chloroform extracts were dried over Drierite®, filtered, and the solvent removed in vacuo leaving a white residual solid. The latter was recrystallized from ethyl acetate giving 12.4 g. of 1-(2-cyanoethyl)-4-carbamylpiperidine, M.P. 151.0–152.6° C. (corr.).

1-(2-cyanoethyl) - 4 - carbamylpiperidine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1 - naphthalenecarboxylic acid, cinnamic acid, cyclohexanecarboxylic acid, mandelic acid, tropic acid, crontonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzene-sulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE-66 resin, hydrofluoric acid, hydrochloric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate, (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE-66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

1-(2-cyanoethyl)-4-carbamylpiperidine can be reacted with hydriodic acid to form 1-(2-cyanoethyl)-4-carbamylpiperidine hydriodide, useful as a characterizing intermediate.

1-(2-cyanoethyl)-4-carbamylpiperidine, in the form of its hydriodide salt, can be converted to the hydrochloride salt by passing an aqueous solution of the former over an ion-exchange resin saturated with chloride ions, for example, Rohm and Haas' Amberlite® IRA-400 resin.

EXAMPLE 2

*1-cyanomethyl-4-cyclohexylmethylpiperidine* [III: $R_2$ is 4-$CH_2C_6H_{11}$; $R_3$ is H; Y' is $CH_2$]

A solution of 36.2 g. (0.20 mole) of 4-cyclohexylmethylpiperidine and 7.55 g. (0.10 mole) of chloroacetonitrile in 100 ml. of benzene was heated under reflux for three hours after the initial reaction had subsided. The solid 4-cyclohexylmethylpiperidine hydrochloride which had separated was filtered off, and the filtrate taken to dryness. Recrystallization of the residue once from hexane and once from methanol/water afforded 15.9 g. of 1-cyanomethyl-4-cyclohexylmethylpiperidine, M.P. 78.5–79.8° C. (corr.).

EXAMPLES 3–21

The compounds of Formula III listed below in Table 1, where Y' $CH_2CH_2$, were prepared from acrylonitrile and an appropriate substituted-piperidine according to the procedure described above in Example 1, and the compounds, where Y' is $(CH_2)_3$, $(CH_2)_4$, $(CH_2)_5$, or $(CH_2)_6$, were prepared according to the procedure described in Example 2. $R_3$ in each case is hydrogen. All melting points, given for the free base form, are corrected unless noted otherwise.

TABLE 1

| Example | $R_2$ | Y' | M.P. (° C.) | Cryst. from— |
|---|---|---|---|---|
| 3 | 4-CONHCH$_3$ | CH$_2$CH$_2$ | 116.4–117.2 | Ethyl acetate. |
| 4 | 4-CONHC$_2$H$_5$ | CH$_2$CH$_2$ | 110.6–111.8 | Benzene/hexane. |
| 5 | 4-CON(CH$_3$)$_2$ | CH$_2$CH$_2$ | 65.0–66.8 | Ethyl acetate/hexane. |
| 6 | 4-CON(C$_2$H$_5$)$_2$ | CH$_2$CH$_2$ | B.P., 151–159/0.073–0.113 mm | |
| 7 | 4-CH$_2$OH | CH$_2$CH$_2$ | B.P., 102.0–104.1/0.065–0.071 mm.; $n_D^{25}$=1.4930.$^a$ | |
| 8 | 4-(CH$_2$)$_3$OH | CH$_2$CH$_2$ | 44.2–45.4 | |
| 9 | 2-COOC$_2$H$_5$ | CH$_2$CH$_2$ | B.P., 64.1–66.5/0.029–0.031 mm.; $n_D^{25}$=1.4675. | |
| 10 | 3-COOCH$_3$ | CH$_2$CH$_2$ | B.P., 68–72/0.023 mm.; $n_D^{25}$=1.4735. | |
| 11 | 4-COOCH$_3$ | CH$_2$CH$_2$ | 42.4–43.4 $^b$ | |
| 12 | 4-COOCH$_2$CH(CH$_3$)$_2$ | CH$_2$CH$_2$ | 205–207/16 mm.; $n_D^{25}$=1.4660 | |
| 13 | 4-CH$_2$C$_6$H$_5$ | CH$_2$CH$_2$ | B.P., 131.5–135/0.08 mm.; $n_D^{25}$=1.5289. | |
| 14 | 4-CH$_2$C$_6$H$_{11}$ | CH$_2$CH$_2$ | B.P., 102.0–112/0.12 mm.; $n_D^{25}$=1.4889. | |
| 15 | 4-CH$_2$C$_6$H$_{11}$ | CH$_2$CH$_2$ | B.P., 102.0–112/0.12 mm.; $n_D^{25}$=1.4889. | |
| 16 | 2-CH$_2$C$_6$H$_{11}$ | CH$_2$CH$_2$ | B.P., 106.5–111.5/0.07–0.09 mm.; $n_D^{25}$=1.4948. | |
| 17 | 4-CH$_2$C$_6$H$_{11}$ | (CH$_2$)$_3$ | 45.6–55.2 | Hexane. |
| 18 | 4-CH$_2$C$_6$H$_{11}$ | (CH$_2$)$_4$ | B.P., 113–114/0.001 mm.; $n_D^{25}$=1.4856 $^c$ | |
| 19 | 2-CH$_2$C$_6$H$_{11}$ | (CH$_2$)$_4$ | B.P., 124–130/0.025 mm.; $n_D^{25}$=1.4898.$^d$ | Do. |
| 20 | 4-CH$_2$C$_6$H$_{11}$ | (CH$_2$)$_5$ | 40.0–42.8 | |
| 21 | 4-CH$_2$C$_6$H$_{11}$ | (CH$_2$)$_6$ | B.P., 149–152/0.059 mm.; $n_D^{25}$=1.4844.$^e$ | |

$^a$ Hydrochloride salt, recrystallized from ethanol/ether has M.P. 185–188° C. (uncorr.).
$^b$ B.P. 123–124° C./0.38 mm.
$^c$ Hydrochloride salt, recrystallized from acetone, gave M.P. 204.8–206.0° C. (corr.).
$^d$ Hydrochloride salt, recrystallized from acetone, gave M.P. 150.0–152.4° C. (corr.).
$^e$ Hydrochloride salt, recrystallized from acetone, gave M.P. 187.4–189.9° C. (corr.).

EXAMPLE 22

*1-cyanomethyl-2,6-dimethyl-4-hydroxypiperidine* [III: $R_2$ is 4-HO; $R_3$ is 2,6-di-CH$_3$; Y' is CH$_2$]

By reacting 2,6-dimethyl-4-hydroxypiperidine with an equimolar amount of α-bromoacetonitrile in the presence of an acid-acceptor, for example, sodium carbonate, in an organic solvent inert under the conditions of the reaction, for example, acetonitrile, and isolating the product from an alkaline medium, there can be obtained 1-cyanomethyl-2,6-dimethyl-4-hydroxypiperidine.

EXAMPLE 23

*1 - (4 - cyanobutyl) - 4 - hydroxy-2,2,4,6,6-pentamethylpiperidine* [III: $R_2$ is 4-HO; $R_3$ is 2,2,4,6,6-penta-CH$_3$; Y' is (CH$_2$)$_4$]

By reacting ζ-bromovaleronitrile with 4-hydroxy-2,2,4,6,6-pentamethylpiperidine according to the manipulative procedure described above in Example 22, there can be obtained 1 - (4 - cyanobutyl) - 4 - hydroxy-2,2,4,6,6-pentamethylpiperidine.

EXAMPLES 24–30

By following the manipulative procedure described above in Example 1, replacing the 4-carbamylpiperidine used therein with a molar equivalent amount of an appropriately substituted piperidine, there can be obtained the 1-(2-cyanoethyl)-substituted-piperidines of Formula III listed in Table 2 below where Y' in each case is CH$_2$CH$_2$.

TABLE 2

| Ex. | $R_2$ | $R_3$ |
|---|---|---|
| 24 | 4-HO | 2,2-di-CH$_3$-6-(CH$_3$)$_2$CHCH$_2$ |
| 25 | 4-(CH$_2$)$_6$OH | |
| 26 | 4-NHCHO | |
| 27 | 4-NHCOCH(C$_2$H$_5$)CH$_2$CH$_3$ | |
| 28 | 3-CONHCH$_2$CH$_2$CH$_2$CH$_3$ | |
| 29 | 4-CONC$_5$H$_{10}$ | |
| 30 | 4-CONC$_4$H$_8$ | |

EXAMPLE 31

*3-(4-carbamyl-1-piperidyl)propylamine* [I: $R_2$ is 4-CONH$_2$; $R_3$ and $R_4$ are H; Y is (CH$_2$)$_3$; $n$ is 1]

To a solution of 34.75 g. (0.19 mole) of 1-(2-cyanoethyl)-4-carbamylpiperidine in 450 ml. of ethanol saturated with anhydrous ammonia was added 4.2 g. of a 5% rhodium-on-alumina catalyst. The mixture was reduced with hydrogen under an initial pressure of 210 pounds p.s.i. at a temperature of 25° C. Reduction was complete in three hours. The catalyst was removed by filtration, washed with ethanol, the filtrate concentrated to dryness in vacuo and the white crystalline residue extracted with acetone, filtered, and the filtrate taken to dryness yielding 25.4 g. of a white powder which was recrystallized twice from a benzenehexane mixture giving 22.0 g. of 3-(4-carbamyl-1-piperidyl)propylamine, M.P. 85–88° C. (uncorr.).

3 - (4 - carbamyl - 1 piperidyl)propylamine reacts with formic acid, acetic acid, isobutyric acid, alpha - mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexane - carboxylic acid, mandelic acid, tropic acid, crotonic acid, acetylene dicarboxylic acid, sorbic acid, 2-furancarboxylic acid, cholic acid, pyrenecarboxylic acid, 2 - pyridinecarboxylic acid, 3 - indoleacetic acid, quinic acid, sulfamic acid, methanesulfonic acid, isethionic acid, benzenesulfonic acid, p - toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha - mercaptopropionate, malate (or acid malate), fumarate (or acid fumarate), succinate (or acid succinate), succinamate, tartrate (or bitartrate), citrate (or acid citrate), lactate, benzoate, 4 - methoxybenzoate, phthalate, (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2 - furancarboxylate, cholate, pyrenecarboxylate, 2 - pyridinecarboxylate, 3-indoleacetate, quinate, sulfamate, methanesulfonate, isethionate, benzenesulfonate, p - toluenesulfonate, benzenesulfinate, butylarsonate, diethylphosphinate, 6-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate, (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

3 - (4 - carbamyl - 1 - piperidyl)propylamine can be reacted with hydriodic acid to form 3 - (4 - carbamyl - 1-piperidyl)propylamine hydriodide, useful as a characterising intermediate.

3 - (4 - carbamyl - 1 - piperidyl)propylamine, in the form of its hydriodide salt, can be converted to the hydrochloride salt by passing an aqueous solution of the former over an ion-exchange resin saturated with chloride ions, for example, Rohm & Haas' Amberlite® IRA–400 resin.

EXAMPLES 32–47

The following mono-[(1-piperidyl)-lower-alkyl] amines of Formula I [$n$ is 1; $R_3$ and $R_4$ are H] listed below in Table 3 were prepared according to the procedure described above in Example 31 by reduction of an appropriate 1($\omega$-cyano-lower-alkyl)piperidine of Formula III with hydrogen over a rhodimum-on-alumina catalyst and in an ethanol solution saturated with anhydrous ammonia. All melting points are corrected.

EXAMPLES 48–58

By following the manipulative procedure described above in Example 31, substituting for the 1-(2-cyanoethyl)4-carbamyl-piperidine used therein, a molar equivalent amount of the 1-(cyano-lower-alkyl)-substituted-piperidines described above in Examples 6, 7, and 22–30, there can be obtained the respective (substituted - 1 - piperidyl)-lower-alkylamines of Formula I ($R_4$ is H; $n$ is 1) listed below in Table 4.

TABLE 4

| Example | Y | $R_2$ | $R_3$ |
|---|---|---|---|
| 48 | $(CH_2)_3$ | 4-$CH_2OH$ | |
| 49 | $(CH_2)_3$ | 4-$CH_2CH_2CH_2OH$ | |
| 50 | $(CH_2)_2$ | 4-HO | |
| 51 | $(CH_2)_5$ | 4-HO | 2,6-di-$CH_3$ |
| 52 | $(CH_2)_3$ | 4-HO | 2,2,4,6,6-penta-$CH_3$ |
| 53 | $(CH_2)_3$ | 4-$(CH_2)_6OH$ | 2,2-di-$CH_3$-6-$(CH_3)_2CHCH_2$ |
| 54 | $(CH_2)_3$ | 4-NHCHO | |
| 55 | $(CH_2)_3$ | 4-$NHCOCH(C_2H_5)CH_2CH_3$ | |
| 56 | $(CH_2)_3$ | 3-$CONHCH_2CH_2CH_2CH_3$ | |
| 57 | $(CH_2)_3$ | 4-$CONC_5H_{10}$ | |
| 58 | $(CH_2)_3$ | 4-$CONC_4H_8$ | |

EXAMPLE 59

*N,N - bis - {3 - [4 - (N - methylcarbamyl) - 1 - piperidyl] propyl}amine* [I: $R_2$ is 4-$CONHCH_3$; $R_3$ is H; $R_4$ is H; Y is $(CH_2)_3$; $n$ is 2]

1 - (2 - cyanoethyl) - 4 - (N - methylcarbamyl)piperidine (39 g., 0.20 mole) was dissolved in 500 ml. of ethanol saturated with anhydrous ammonia and reduced over 4 g. of a rhodium-on-alumina catalyst under 208 pounds p.s.i. of hydrogen. When reduction was completed, the catalyst was removed by filtration and the filtrate taken to dryness leaving a waxy white solid. The latter was extracted with five 300 ml. portions of boiling ether and the extracts, which contained the mono-amine, were set aside for further work. The ether-insoluble material was boiled with 200 ml. of acetone and dried giving 8.6 g. of material of M.P. 190–195° C. (uncorr.). The latter was recrystallized from an ethanol/acetone mixture giving 6.8 g. of N,N-bis-{3-[4-(N-methylcarbamyl)-1-piperidyl]propyl}amine, M.P. 203.0–203.8° C. (corr.).

*Analysis.*—Calcd. for $C_{20}H_{39}N_5O_2$: $N_T$, 18.36; $N_B$, 11.01. Found: $N_T$, 18.29; $N_B$, 11.02.

The ether extracts, containing the mono-amine, were taken to dryness and the residue taken into ethanol and treated with an ethereal solution of anhydrous hydrogen chloride. The dihydrochloride salt which separated was

TABLE 3

| Example | $R_2$ | Y | Base or Salt | M.P. (° C.) | Cryst. from— |
|---|---|---|---|---|---|
| 32 | 4-$CONHCH_3$ | $(CH_2)_3$ | 2HCl | 239.6–240.6 | Ethanol/ether. |
| 33 | 4-$CONCH_2H_5$ | $(CH_2)_3$ | 2HCl | 245.0–246.2 | Do. |
| 34 | 4-$CON(CH_3)_2$ | $(CH_2)_3$ | Base | (a) | |
| 35 | 4-$CON(C_2H_5)_2$ | $(CH_2)_3$ | Base | (b) | |
| 36 | 4-$CH_2C_6H_5$ | $(CH_2)_3$ | 2HCl | 191.6–193.4 | Do. |
| 37 | 4-$CH_2C_6H_{11}$ | $(CH_2)_3$ | 2HCl | 280.2–282.4 | Do. |
| 38 | 4-HO | $(CH_2)_3$ | Base | (c) | |
| 39 | 4-HO$(CH_2)_3$ | $(CH_2)_3$ | Base | 163.8–165.2 | Isoproponal. |
| 40 | 4-$(CH_3)_2CH$ | $(CH_2)_3$ | 2HCl | 215.2–217.8 | Do. |
| 41 | 3-$CH_3CONH$ | $(CH_2)_3$ | Base | (d) | |
| 42 | 4-$CH_2C_6H_{11}$ | $(CH_2)_2$ | 2HCl | 259.8–262.8 | Ethanol/acetone. |
| 43 | 2-$CH_2C_6H_{11}$ | $(CH_2)_3$ | 2HCl | 200.0–206.8 | Isopropanol. |
| 44 | 4-$CH_2C_6H_{11}$ | $(CH_2)_4$ | 2HCl | 262.8–266.0 | Do. |
| 45 | 4-$CH_2C_6H_{11}$ | $(CH_2)_5$ | 2HCl | 250.6–257.2 | Do. |
| 46 | 4-$CH_2C_6H_{11}$ | $(CH_2)_6$ | 2HCl | 231.6–236.2 | Ethanol. |
| 47 | 4-$CH_2C_6H_{11}$ | $(CH_2)_7$ | 2HCl | 247.0–249.6 | Acetone. | a B.P. 123–124° C/0.09 mm.; $n_D^{25}$=1.5042.
b B.P. 131–138° C./0.109–0.113 mm.; $n_D^{25}$=1.4938.
c B.P. 85.3–86.8° C./0.033 mm.; $n_D^{25}$=1.5050.
d B.P. 147–157° C./0.045–0.095 mm.; $n_D^{25}$=1.5070.

collected and recrystallized from an ethanol/ether mixture giving 5.5 g. of 3-[4-(N-methylcarbamyl)-1-piperidyl]propylamine dihydrochloride, M.P. 238–240° C. (uncorr.).

N,N - bis - {3 - [4 - (N' - methylcarbamyl) - 1-piperidyl]propyl}amine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexane-carboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butyl-arsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

N,N - bis - {3 - [4 - (N' - methylcarbamyl) - 1 - piperidyl]propyl}amine can be reacted with hydriodic acid to form N,N, - bis - {3 - [4 - (N' - methylcarbamyl) - 1-piperidyl]propyl}amine hydriodide, useful as a characterizing intermediate.

N,N - bis - {3 - [4 - (N'-methylcarbamyl) - 1 - piperidyl]propyl}amine, in the form of its hydriodide salt, can be converted to the hydrochloride salt by passing an aqueous solution of the former over an ion-exchange resin saturated with chloride ions, for example, Rohm and Haas' Amberlite® IRA–400 resin.

EXAMPLES 60–73

The following N,N-bis-[(1-piperidyl)-lower-alkyl]-amines of Formula I [$n$ is 2; $R_3$ and $R_4$ are H] listed below in Table 5 were prepared according to the procedure described above in Example 59 by reduction of an appropriate 1-($\omega$-cyano-lower-alkyl)piperidine of Formula III with hydrogen over a rhodium-on-alumina catalyst. All melting points are corrected.

TABLE 5

| Example | $R_2$ | Y | Base or Salt | M.P. (° C.) | Crystd. from— |
|---|---|---|---|---|---|
| 60 | 4-CONHC$_2$H$_5$ | (CH$_2$)$_3$ | Base | 191.2–192.8 | |
| 61 | 4-CON(CH$_3$)$_2$ | (CH$_2$)$_3$ | Base | 87.8–88.6 | Hexane. |
| 62 | 4-CH$_2$C$_6$H$_5$ | (CH$_2$)$_3$ | 3HCl | 266.6–268.0 | Ether. |
| 63 | 4-CH$_2$C$_6$H$_{11}$ | (CH$_2$)$_3$ | 3HCl | >300 | Isopropanol/ether. |
| 64 | 4-(CH$_3$)$_2$CH | (CH$_2$)$_3$ | Base | (a) | |
| 65 | 4-HO | (CH$_2$)$_3$ | Base | (b) | |
| 66 | 4-HO(CH$_2$)$_3$ | (CH$_2$)$_3$ | 3HCl | 191.2–199.4 | Isopropanol. |
| 67 | 4-CH$_2$C$_6$H$_{11}$ | (CH$_2$)$_2$ | 3HCl | 294.4–298.2 | Ethanol. |
| 68 | 4-CH$_2$C$_6$H$_{11}$ | (CH$_2$)$_3$ | Base | 37.2–43.0 | Acetone. |
| 69 | 2-CH$_2$C$_6$H$_{11}$ | (CH$_2$)$_3$ | 3HCl | 179.2–192.4 | Do. |
| 70 | 4-CH$_2$C$_6$H$_{11}$ | (CH$_2$)$_4$ | Base | 50.2–51.0 | Hexane. |
| 71 | 4-CH$_2$C$_6$H$_{11}$ | (CH$_2$)$_5$ | Base | 57.2–58.5 | Acetone. |
| 72 | 4-CH$_2$C$_6$H$_{11}$ | (CH$_2$)$_6$ | Base | 52.4–54.6 | Do. |
| 73 | 4-CH$_2$C$_6$H$_{11}$ | (CH$_2$)$_7$ | Base | 63.6–64.4 | Do. | a B.P. 125.5–131.0° C./0.0015 mm.; $n_D^{25}$=1.4832. Trihydrochloride, recrystallized from isopropanol, gave M.P. 291.2–293.4° C. (corr.).
b B.P. 186–193° C./0.002–0.0024 mm.; $n_D^{25}$=1.5197.

EXAMPLES 74–83

By following the manipulative procedure described above in Example 59, substituting for the 1-(2-cyanoethyl)-4-(N - methylcarbamyl)piperidine used therein, a molar equivalent amount of the 1-(cyano-lower-alkyl)-substituted-piperidines described above in Example 6, and 22–30, there can be obtained the respective N,N-bis-[(substituted-1-piperidyl)-lower-alkyl] - amines of Formula I ($R_4$ is H; $n$ is 2) listed below in Table 6.

TABLE 6

| Example | Y | $R_2$ | $R_3$ |
|---|---|---|---|
| 74 | (CH$_2$)$_3$ | 4-CH$_2$OH | |
| 75 | (CH$_2$)$_2$ | 4-HO | |
| 76 | (CH$_2$)$_5$ | 4-HO | 2,6-di-CH$_3$. |
| 77 | (CH$_2$)$_3$ | 4-HO | 2,2,4,6,6-penta-CH$_3$. |
| 78 | (CH$_2$)$_3$ | 4-(CH$_2$)$_6$OH | 2,2-di-CH$_3$-6-(CH$_3$)$_2$CHCH$_2$. |
| 79 | (CH$_2$)$_3$ | 4-NHCHO | |
| 80 | (CH$_2$)$_3$ | 4-NHCOCH(C$_2$H$_5$)CH$_2$CH$_3$ | |
| 81 | (CH$_2$)$_3$ | 3-CONHCH$_2$CH$_2$CH$_2$CH$_3$ | |
| 82 | (CH$_2$)$_3$ | 4-CONC$_5$H$_{10}$ | |
| 83 | (CH$_2$)$_3$ | 4-CONC$_4$H$_8$ | |

EXAMPLE 84

N-benzoyl-N,N-bis-[3-(4-cyclohexylmethyl-1 - piperidyl) propyl]amine dihydrochloride [I: $R_2$ is 4-$CH_2C_6H_{11}$; $R_3$ is H; $R_4$ is $C_6H_5CO$; Y is $(CH_2)_3$; $n$ is 2]

In two separate runs, a mixture of 4.6 g. (0.01 mole) of N,N-bis-[3-(4-cyclohexylmethyl-1 - piperidyl)propyl]amine, 1.76 g. (0.013 mole) of benzoyl chloride, 2 g. of triethylamine, and 50 ml. of benzene was heated under reflux for three hours, cooled, filtered, and the filtrates taken to dryness. The residual oils in each case were combined, taken into methanol and treated with excess ethanolic hydrogen chloride. The precipitate, which separated on standing and cooling, was collected and recrystallized from an isopropanol/acetone mixture giving 4.0 g. of N-benzoyl-N,N-bis-[3-(4-cyclohexylmethyl-1-piperidyl)propyl]amine dihydrochloride, M.P. 272.0–279.0° C. (corr.).

EXAMPLES 85–122

The following N-($R_4$)-N,N-bis-[(4-cyclohexylmethyl-1-piperidyl) - lower - alkyl]amines of Formula I [$R_2$ is 4-$CH_2C_6H_{11}$; $R_3$ is H; $n$ is 2] listed below in Table 7 were prepared using the procedure described above in Example 84 by reaction of an appropriate acid chloride with an appropriate N,N-bis-[(4-cyclohexylmethyl - 1 - piperidyl)-lower-alkyl]amine. All melting points are corrected.

EXAMPLE 123

N-acetyl-N,N-bis-[3-(4-cyclohexylmethyl - 1 - piperidyl) propyl]amine dihydrochloride [I: $R_2$ is 4-$CH_2C_6H_{11}$; $R_3$ is H; $R_4$ is $CH_3CO$; Y is $(CH_2)_3$; $n$ is 2]

A solution of 13.8 g. (0.03 mole) of N,N-bis-[3-(4-cyclohexylmethyl-1 - piperidyl)propyl]amine, 4 g. (0.04 mole) of acetic anhydride, and 50 ml. of pyridine was allowed to stand overnight at room temperature and then warmed one hour on a steambath. The mixture was taken to dryness in vacuo; the residual oil was dissolved in 100 ml. of benzene and the solution washed once with dilute potassium carbonate, several times with water, and taken to dryness. The residual oil was distilled in vacuo, the fraction boiling at 203–210° C./0.002 mm.

$$(n_D^{25} = 1.5062)$$

being collected as product.

A small amount of the oil, converted to the hydrochloride salt and recrystallized from absolute ethanol, gave N-acetyl-N,N-bis-[3-(4-cyclohexylmethyl - 1 - piperidyl) propyl]amine dihydrochloride, M.P. 277.2–279.0° C. (corr.).

EXAMPLES 123–134

The following N-($R_4$) - N,N - bis - [(4 - cyclohexylmethyl-1-piperidyl)-lower - alkyl]amines of Formula I [$R_2$ is 4-$CH_2C_6H_{11}$; $R_3$ is H; $n$ is 2] listed below in Table 8 were prepared according to the procedure described above in Example 123 by reacting an appropriate acid anhydride with an appropriate N,N-bis-[(4 - cyclohexylmethyl - 1-piperidyl)-lower-alkyl]amine. All melting points are corrected.

TABLE 7

| Example | Y | $R_4$ | Base or Salt | M.P. (° C.) | Cryst. from— |
|---|---|---|---|---|---|
| 85 | $(CH_2)_6$ | $C_6H_5CO$ | Base | 41.2–42.6 | Acetone. |
| 86 | $(CH_2)_6$ | 2-$ClC_6H_4CO$ | 2HCl | 241.2–243.0 | Isopropanol/acetone. |
| 87 | $(CH_2)_6$ | 4-$ClC_6H_4CO$ | Base | 54.6–56.0 | Acetone. |
| 88 | $(CH_2)_6$ | 3,4-$Cl_2C_6H_3CO$ | 2HCl | 179.4–182.8 | Do. |
| 89 | $(CH_2)_3$ | 4-$CH_3OC_6H_4CO$ | 2HCl | 245.2–246.0 | Ethanol/acetone. |
| 90 | $(CH_2)_6$ | 4-$CH_3OC_6H_4CO$ | 2HCl | 202.4–206.2 | Do. |
| 91 | $(CH_2)_3$ | 3-$CF_3C_6H_4CO$ | 2HCl | 231.0–231.8 | Isopropanol. |
| 92 | $(CH_2)_6$ | 4-$CF_3C_6H_4CO$ | 2HCl | 195.4–198.0 | Acetone/ether. |
| 93 | $(CH_2)_6$ | $(CH_3)_2CHCO$ | 2HCl | 192.6–196.0 | Ethanol/acetone. |
| 94 | $(CH_2)_5$ | $CH_3(CH_2)_3CO$ | (*) | 185.0–187.4 | Methanol/acetone. |
| 95 | $(CH_2)_6$ | $CH_3(CH_2)_3CO$ | 2HCl | 181.0–185.0 | Acetone. |
| 96 | $(CH_2)_6$ | $(CH_3)_2CHCH_2CO$ | 2HCl | 180.4–184.8 | Acetone/ether. |
| 97 | $(CH_2)_7$ | $CH_3(CH_2)_3CO$ | (*) | 130.4–134.0 | Acetone. |
| 98 | $(CH_2)_6$ | $CH_3(CH_2)_4CO$ | 2HCl | 181.8–183.6 | Do. |
| 99 | $(CH_2)_6$ | $CH_3(CH_2)_5CO$ | 2HCl | 178.0–184.0 | Acetone/ethyl acetate. |
| 100 | $(CH_2)_7$ | $CH_3(CH_2)_5CO$ | 2HCl | 191.6–194.6 | Ethanol/ether. |
| 101 | $(CH_2)_3$ | $C_3H_5CO$ | 2HCl | 215.0–219.4 | Do. |
| 102 | $(CH_2)_3$ | $C_4H_7CO$ | 2HCl | 195.6–201.2 | Ethanol/acetone/ether. |
| 103 | $(CH_2)_3$ | $C_6H_{11}CO$ | 2HCl | 224–226.5 | Methanol/acetone. |
| 104 | $(CH_2)_6$ | $C_6H_{11}CO$ | 2HCl | 187.0–189.2 | Chloroform/ethyl acetate. |
| 105 | $(CH_2)_3$ | $C_6H_5OCH_2CO$ | Base | 59.2–63.4 | Acetone. |
| 106 | $(CH_2)_6$ | $C_6H_5OCH_2CO$ | Base | 55.2–56.4 | Do. |
| 107 | $(CH_2)_6$ | COCO | Base | 97.6–99.2 | Do. |
| 108 | $(CH_2)_6$ | $COCH_2CH_2CO$ | 4HCl | 258.0–261.0 | Methanol/acetone/ether. |
| 109 | $(CH_2)_3$ | $CH_3(CH_2)_3CO$ | 2HCl | 197.0–199.8 | Ethanol/acetone. |
| 110 | $(CH_2)_3$ | $C_6H_5CH=CHCO$ | Base | 104.8–106.2 | Acetone. |
| 111 | $(CH_2)_4$ | $C_6H_5CH=CHCO$ | 2HCl | 225.0–227.0 | Ethanol/acetone. |
| 112 | $(CH_2)_5$ | $C_6H_5CH=CHCO$ | 2HCl | 198.0–201.0 | Ethanol/acetone/ether. |
| 113 | $(CH_2)_6$ | $C_6H_5CH=CHCO$ | 2HCl | 237.0–240.0 | Methanol/acetone/ether. |
| 114 | $(CH_2)_7$ | $C_6H_5CH=CHCO$ | 2HCl | 230–232 | Do. |
| 115 | $(CH_2)_6$ | 4-$CH_3C_6H_4SO_2$ | 2HCl | 188.0–189.2 | Acetone/ether. |
| 116 | $(CH_2)_6$ | 4-$NO_2C_6H_4CO$ | 2HCl | 192–194.2 | Acetone. |
| 117 | $(CH_2)_6$ | 3,5-di-($NO_2$)-$C_6H_3CO$ | 2HCl | 255.0–256.0 | Methanol/acetone. |
| 118 | $(CH_2)_6$ | 3-$NO_2$-4-Cl-$C_6H_3CO$ | 2HCl | 176.8–178.8 | Acetone. |
| 119 | $(CH_2)_6$ | 3-Cl-5-HO-$C_6H_3CO$ | 2HCl | 186.4–187.2 | Methanol/ether. |
| 120 | $(CH_2)_6$ | $Cl_2CHCO$ | (*) | 122.0–125.4 | Acetone/ether. |
| 121 | $(CH_2)_6$ | 2-$HOC_6H_4CO$ | Base | 79.0–82.6 | Hexane. |
| 122 | $(CH_2)_6$ | 2-$CH_3CO_2C_6H_4CO$ | (*) | 109.0–111.0 | Acetone. |

*Bis-cyclohexanesulfamate salt.

TABLE 8

| Example | Y | $R_4$ | Base or Salt | M.P. (° C.) | Cryst. from— |
|---|---|---|---|---|---|
| 124 | $(CH_2)_4$ | $CH_3CO$ | Base | 59.2–61.0 | Hexane. |
| 125 | $(CH_2)_5$ | $CH_3CO$ | 2HCl | 258.8–262.8 | Ethanol/ether. |
| 126 | $(CH_2)_6$ | $CH_3CO$ | $2HCl.H_2O$ | 245.8–247.6 | Do. |
| 127 | $(CH_2)_7$ | $CH_3CO$ | 2HCl | 237.6–238.8 | Isopropanol/acetone. |
| 128 | $(CH_2)_3$ | $CH_3CH_2CO$ | 2HCl | 235.2–237.4 | Ethanol/acetone/ether. |
| 129 | $(CH_2)_4$ | $CH_3CH_2CO$ | 2HCl | 226.0–227.8 | Ethanol/acetone. |
| 130 | $(CH_2)_6$ | $CH_3CH_2CO$ | 2HCl | 227.2–228.6 | Methanol/acetone. |
| 131 | $(CH_2)_3$ | $CH_3(CH_2)_2CO$ | 2HCl | 203.6–206.4 | Ethanol/acetone. |
| 132 | $(CH_2)_5$ | $CH_3(CH_2)_2CO$ | 2HCl | 226.0–231.0 | Chloroform/acetone. |
| 133 | $(CH_2)_6$ | $CH_3(CH_2)_2CO$ | 2HCl | 201.8–203.2 | Methanol/acetone/ether. |
| 134 | $(CH_2)_7$ | $CH_3(CH_2)_2CO$ | 2HCl | 206.8–207.4 | Acetone. |

EXAMPLE 135

$N$ - ($\beta$-carboxypropionyl)-$N,N$-bis-[3-(4-cyclohexylmethyl-1-piperidyl)propyl]amine dihydrochloride [I: $R_2$ is 4-$CH_2C_6H_{11}$; $R_3$ is H; $R_4$ is $COCH_2CH_2COOH$]

A mixture of 11.6 g. (0.025 mole) of N,N-bis-[3-(4-cyclohexylmethyl-1-piperidyl)propyl]amine and 2.65 g. (0.026 mole) of succinic anhydride in about 200 ml. of benzene was heated under reflux using a water separator for three hours and then taken to dryness. The residual gum was dissolved in acetone and reprecipitated by addition of hexane, the process being repeated three times, and the remaining gummy material was then dissolved in a small volume of ethanol and acidified by addition of excess ethanolic hydrogen chloride. Precipitation of the resulting salt by addition of ether and recrystallization of the precipitate from acetone/methanol gave 6.2 g. of N-($\beta$ - carboxypropionyl) - N,N-bis-[3-(4-cyclohexylmethyl-1-piperidyl)propyl]amine dihydrochloride, M.P. 239.0 (dec., corr.).

EXAMPLE 136

$N$ - ($\beta$ - carboxypropionyl) - $N,N$-bis-[6-(4-cyclohexylmethyl-1-piperidyl)hexyl]amine dihydrochloride [I: $R_2$ is 4-$CH_2C_6H_{11}$; $R_3$ is H; $R_4$ is $COCH_2CH_2COOH$; Y is $(CH_2)_6$; $n$ is 2] was prepared from 16.29 g. (0.03 mole) of N,N - bis - [6-(4-cyclohexylmethyl-1-piperidyl)hexyl]amine and 3.6 g. (0.04 mole) of succinic anhydride in about 250 ml. of benzene using the manipulative procedure described above in Example 135. The product was isolated in the form of the hydrochloride salt and the latter recrystallized from ethanol/acetone to give 9.4 g. of N-($\beta$-carboxypropionyl)-N,N-bis-[6-(4-cyclohexylmethyl-1 - piperidyl)hexyl]amine dihydrochloride, M.P. 223.5–227.5° C. (corr.).

EXAMPLE 137

$N$ - [$N'$ - (2-carboxyphenyl)carbamoyl]-$N,N$-bis-[3-(4-cyclohexylmethyl - 1 - piperidyl)propyl]amine [I: $R_2$ is 4-$CH_2C_6H_{11}$; $R_3$ is H; $R_4$ is 2-$HOOCC_6H_4NHCO$; Y is $(CH_2)_3$; $n$ is 2] was prepared from 17.74 g. (0.039 mole) of N,N - bis - [3-(4-cyclohexylmethyl-1-piperidyl)propyl]amine and 6.9 g. (0.042 mole) of isatoic anhydride in about 250 ml. of benzene using the manipulative procedure described above in Example 135. The product was isolated in the form of the free base which was recrystallized from acetone to give 10.3 g. of N-[N'-(2-carboxyphenyl)carbamoyl] - N,N - bis-[3-(4-cyclohexylmethyl-1-piperidyl)propyl]amine, M.P. 133.8–138° C. (corr.).

EXAMPLE 138

$N$ - [$N'$ - (2-carboxyphenyl)carbamoyl]-$N,N$-bis-[6-(4-cyclohexylmethyl - 1 - piperidyl)hexyl]amine [I: $R_2$ is 4-$CH_2C_6H_{11}$; $R_3$ is H; $R_4$ is 2-$HOOCC_6H_4NHCO$; Y is $(CH_2)_6$; $n$ is 2] was prepared from 21.7 g. (0.04 mole) of N,N - bis - [6 - (4 - cyclohexylmethyl-1-piperidyl)hexyl]amine and 7.18 g. (0.044 mole) of isatoic anhydride in about 200 ml. of benzene using the manipulative procedure described above in Example 135. The product was isolated in the form of the free base and the latter recrystallized from methanol to give 9.5 g. of N-[N'-(2-carboxyphenyl)carbamoyl] - N,N - bis-[6-(4-cyclohexylmethyl-1-piperidyl)-hexyl]amine, M.P. 167.4–169.0° C. (corr.).

EXAMPLE 139

$N$ - (2-carboxycyclohexylcarbonyl) - $N,N$ - bis - [6-(4-cyclohexylmethyl - 1 - piperidyl)hexyl]amine dihydrochloride [I: $R_2$ is 4-$CH_2C_6H_{11}$; $R_3$ is H; $R_4$ is

2-$HOOCC_6H_{10}CO$

Y is $(CH_2)_6$; $n$ is 2] was prepared from 16.3 g. (0.03 mole) of N,N - bis-[6-(4-cyclohexylmethyl-1-piperidyl)hexyl]amine and 5.55 g. (0.036 mole) of 1,2-cyclohexanedicarboxylic anhydride in about 100 ml. of benzene using the manipulative procedure described above in Example 135. The product was isolated in the form of the dihydrochloride salt and the latter recrystallized from acetone to give 6.1 g. of N-(2-carboxycyclohexylcarbonyl) - N,N - bis-[6-(4-cyclohexylmethyl-1-piperidyl)hexyl]amine dihydrochloride, M.P. 235.0–235.5° C. (corr.).

EXAMPLE 140

$N$ - ($\beta$-phenylpropionyl)-$N,N$-bis-[3-(4-cyclohexylmethyl-1 - piperidyl)propyl]amine dihydrochloride [I: $R_2$ is 4-$CH_2C_6H_{11}$; $R_3$ is H; $R_4$ is $C_6H_5CH_2CH_2CO$; Y is $(CH_2)_3$; $n$ is 2]

N - cinnamoyl-N,N-bis-[3-(4-cyclohexylmethyl-1-piperidyl)propyl]amine (12.6 g., 0.026 mole) was dissolved in about 200 ml. of absolute ethanol and reduced over 1.0 g. of palladium-on-charcoal catalyst under hydrogen at sixty pounds p.s.i. pressure. Reduction was complete in about two and a half hours, and the mixture was filtered from the catalyst, and the filtrate taken to dryness giving 11.4 g. of a pale yellow viscous oil. The latter was dissolved in 15 ml. of ether, and the solution treated with excess ethanolic hydrogen chloride. The solid which separated was collected, washed with ether and recrystallized from an ethanol/acetone mixture giving 8.9 g. of N - ($\beta$-phenylpropionyl)-N,N-bis-[3-(4-cyclohexylmethyl-1-piperidyl)propyl]amine dihydrochloride, M.P. 257.5–259.0° C. (corr.).

EXAMPLE 141

$N$-($\beta$-phenylpropionyl)-$N,N$-bis-[6-(4-cyclohexylmethyl - 1 - piperidyl)hexyl]amine dihydrochloride [I: $R_2$ is 4-$CH_2C_6H_{11}$; $R_3$ is H; $R_4$ is $C_6H_5CH_2CH_2CO$; Y is $(CH_2)_6$; $n$ is 2] was prepared by catalytic reduction of 14.9 g. (0.02 mole) of N-cinnamoyl-N,N-bis-[6-(4-cyclohexylmethyl-1-piperidyl)hexyl]amine in 200 ml. of ethanol over 1 g. of palladium-on-charcoal catalyst using the manipulative procedure described above in Example 140. The crude product, converted to the dihydrochloride salt, was recrystallized from an ethanol/acetone mixture giving 9.1 g. of N-($\beta$-phenylpropionyl)-N,N-bis-[6-(4-cyclohexylmethyl - 1 - piperidyl)hexyl]amine dihydrochloride, M.P. 185.8–187.6° C. (corr.).

EXAMPLE 142

$N$-($\beta$-cyclohexylpropionyl)-$N,N$ - bis - [3,(4 - cyclohexylmethyl-1-piperidyl)propyl[amine dihydrochloride (I: $R_2$ is 4-$CH_2C_6H_{11}$; $R_3$ is H; $R_4$ is $C_6H_{11}CH_2CH_2CO$; Y is $(CH_2)_3$; $n$ is 2]

N-cinnamoyl-N,N - bis - [3 - (4 - cyclohexylmethyl-1- piperidyl)propyl]amine (9.9 g., 0.015 mole), dissolved in 200 ml. of absolute ethanol, was reduced over 1.0 g. of platinum oxide catalyst under hydrogen at a pressure of about 60 pounds p.s.i. and 60° C. Reduction was completed in about eight hours, and the reaction mixture was filtered from the catalyst, the filtrate diluted with 250 ml. of acetone and cooled. The solid which separated was collected, washed with ether and recrystallized from an ethanol/acetone mixture giving 9.3 g. of N-(β-cyclohexylpropionyl)-N,N-bis-[3-(4-cyclohexylmethyl-1-piperidyl)-propyl]amine dihydrochloride, M.P. 236–240° C. (corr.).

EXAMPLES 143–146

The following N-(β-cyclohexylpropionyl) - N,N - bis-[(4-cyclohexylmethyl-1-piperidyl)-lower-alkyl]amines of Formula I ($R_2$ is 4-$CH_2C_6H_{11}$; $R_3$ is H; $R_4$ is $$C_6H_{11}CH_2CH_2CO$$

$n$ is 2) listed below in Table 9 were prepared by reducing over platinum oxide the corresponding N-cinnamoyl-N,N-bis-[(4-cyclohexyl-methyl-1-piperidyl)-lower-alkyl]amines using the manipulative procedure described above in Example 142.

TABLE 9

| Example | Y | Base or Salt | M.P. (° C.) | Cryst. from— |
|---|---|---|---|---|
| 143 | $(CH_2)_4$ | 2HCl | 229.5–231.0 | Acetone/ethyl/acetate. |
| 144 | $(CH_2)_5$ | 2HCl | 211.0–214.0 | Ethanol/acetone. |
| 145 | $(CH_2)_6$ | 2HCl | 182.2–184.0 | Ethanol/acetone/ether. |
| 146 | $(CH_2)_7$ | 2HCl | 195–197 | Ethanol/ether. |

EXAMPLE 147

N-benzyl - N,N - bis-[3-(4-cyclohexylmethyl-1-piperidyl) propyl]amine [I: $R_2$ is 4-$CH_2C_6H_{11}$; $R_3$ is H; $R_4$ is $C_6H_5CH_2$; Y is $(CH_2)_3$; $n$ is 2]

To a slurry of 0.38 g. (0.01 mole) of lithium aluminum hydride in 30 ml. of tetrahydrofuran was added, over a period of about forty-five minutes, a solution of 5.7 g. (0.01 mole) of N - benzoyl - N,N - bis[3 - (4-cyclohexylmethyl-1-piperidyl)propyl]amine, in 30 ml. of tetrahydrofuran. The mixture was refluxed for five hours, allowed to stand overnight at room temperature, hydrolyzed by dropwise addition of a solution of 0.8 ml. of water in about 10 ml. of tetrahydrofuran and filtered. The filter was washed with ether, the filtrate taken to dryness, and the residue recrystallized from acetone giving 3.1 g. of N-benzyl-N,N-bis-[3-(4-cyclohexylmethyl - 1-piperidyl) propyl]amine, M.P. 36.8–40.2° C. (corr.).

EXAMPLES 148–196

The following N-($R_4$)-N,N-bis-[(4-cyclohexylmethyl-1-piperidyl)-lower alkyl]amines of Formula I [$R_2$ is 4-$CH_2C_6H_{11}$; R is H; $n$ is 2] listed below in Table 10 were prepared by reduction of the corresponding N-($R_4$)-amides with lithium aluminum hydride using the manipulative procedure described above in Example 147. All melting points are corrected.

TABLE 10

| Example | Y | $R^4$ | Base or Salt | M.P. (° C.) | Cryst. from— |
|---|---|---|---|---|---|
| 148 | $(CH_2)_6$ | $C_6H_5CH_2$ | 3HCl | 265.0–268.4 | Methanol/acetone/ether. |
| 149 | $(CH_2)_6$ | 2-$ClC_6H_4CH_2$ | 3HCl | 275.6–282.0 | Ethanol/acetone. |
| 150 | $(CH_2)_6$ | 4-$ClC_6H_4CH_2$ | 3HCl | 239.0–240.8 | Do. |
|  |  |  | (*) | 163.8–166.0 | Methanol/acetone. |
| 151 | $(CH_2)_6$ | 3,4-$Cl_2C_6H_3CH_2$ | 3HCl | 248.5–253.0 | Ethanol/acetone. |
| 152 | $(CH_2)_6$ | 4-$CH_3OC_6H_4CH_2$ | Base | 33.8–36.8 | Acetone. |
| 153 | $(CH_2)_6$ | 4-$CH_3OC_6H_4CH_2$ | 3HCl | 217.2–218.6 | Methanol/acetone. |
| 154 | $(CH_2)_3$ | 3-$CF_3C_6H_4CH_2$ | 3HCl | 285.8–287.6 | Isopropanol/acetone/ether. |
| 155 | $(CH_2)_6$ | 4-$CF_3C_6H_4CH_2$ | 3HCl | 246.8–250.4 | Ethanol/acetone/ether. |
| 156 | $(CH_2)_6$ | $(CH_3)_2CHCH_2$ | 3HCl | 231.0–233.8 | Do. |
| 157 | $(CH_2)_5$ | $CH_3(CH_2)_4$ | 3HCl | 265.0–269.0 | Ethanol/acetone. |
| 158 | $(CH_2)_6$ | $CH_3(CH_2)_4$ | 3HCl | 243.0–247.0 | Methanol/acetone/ether. |
|  |  |  | (*) | 159.0–162.8 | Acetone. |
| 159 | $(CH_2)_6$ | $(CH_3)_2CHCH_2CH_2$ | (*) | 162.0–164.0 | Methanol/acetone. |
| 160 | $(CH_2)_7$ | $CH_3(CH_2)_4$ | 3HCl | 239.0–241.0 | Ethanol/acetone. |
| 161 | $(CH_2)_6$ | $CH_3(CH_2)_5$ | (*) | 160.0–162.0 | Methanol/acetone. |
| 162 | $(CH_2)_6$ | $CH_3(CH_2)_6$ | 3HCl | 260.8–266.4 | Ethanol/acetone. |
| 163 | $(CH_2)_7$ | $CH_3(CH_2)_6$ | 3HCl | 257.0–259.6 | Methanol/acetone. |
| 164 | $(CH_2)_3$ | $C_3H_5CH_2$ | 3HCl | 282.0–282.4 | Ethanol/acetone. |
| 165 | $(CH_2)_3$ | $C_4H_7CH_2$ | 3HCl | 279.6–280.4 | Do. |
| 166 | $(CH_2)_3$ | $C_6H_{11}CH_2$ | 2HCl | 285–287 | Methanol/acetone. |
| 167 | $(CH_2)_6$ | $C_6H_{11}CH_2$ | 3HCl | 262.0–262.6 | Ethanol/acetone. |
| 168 | $(CH_2)_3$ | $C_6H_5OCH_2CH_2$ | Base | 34.4–35.6 | Acetone. |
| 169 | $(CH_2)_6$ | $C_6H_5OCH_2CH_2$ | 3HCl | 200.0 | Methanol/acetone/ether. |
| 170 | $(CH_2)_6$ | —$CH_2CH_2$— | Base | 43.6–44.8 | Isopropanol/acetone. |
| 171 | $(CH_2)_6$ | —$(CH_2)_4$— | 6HCl | 291.0–294.0 | Methanol/acetone. |
| 172 | $(CH_2)_3$ | $C_2H_5$ | 3HCl | >300.0 | Do. |
| 173 | $(CH_2)_4$ | $C_2H_5$ | 3HCl | >300.0 | Methanol. |
| 174 | $(CH_2)_5$ | $C_2H_5$ | 3HCl | 284.0–284.8 | Methanol/acetone. |
| 175 | $(CH_2)_6$ | $C_2H_5$ | 3HCl | 291.2–293.0 | Ethanol. |
| 176 | $(CH_2)_7$ | $C_2H_5$ | 3HCl | 249.8–252.2 | Do. |
| 177 | $(CH_2)_3$ | $C_3H_7$ | 3HCl | 273.4–274.0 | Ethanol/acetone. |
| 178 | $(CH_2)_4$ | $C_3H_7$ | 3HCl | 287.2–288.8 | Isopropanol/acetone. |
| 179 | $(CH_2)_6$ | $C_3H_7$ | 3HCl | 260.8–264.0 | Ethanol/acetone/ether. |
| 180 | $(CH_2)_3$ | $C_4H_9$ | 3HCl | 282.6–283.6 | Ethanol/acetone. |
| 181 | $(CH_2)_5$ | $C_4H_9$ | 3HCl | 255.0–257.0 | Do. |
| 182 | $(CH_2)_6$ | $C_4H_9$ | 3HCl | 236.8–244.0 | Methanol/acetone. |
| 183 | $(CH_2)_7$ | $C_4H_9$ | 3HCl | 229.0–231.0 | Methanol/acetone/ether. |
| 184 | $(CH_2)_3$ | $(CH_2)_4OH$ | 3HCl | 235.0–238.0 | Methanol/acetone. |
| 185 | $(CH_2)_6$ | $(CH_2)_4OH$ | 3HCl | 249.0–251.6 | Ethanol/acetone. |
| 186 | $(CH_2)_3$ | $C_6H_5(CH_2)_3$ | 3HCl | 287.4–288.5 | Do. |
| 187 | $(CH_2)_6$ | $C_6H_5(CH_2)_3$ | 3HCl | 254.0–256.0 | Do. |
| 188 | $(CH_2)_3$ | $C_6H_{11}(CH_2)_3$ | Base | 57.8–60.0 | Acetone. |
| 189 | $(CH_2)_4$ | $C_6H_{11}(CH_2)_3$ | 3HCl | 279.2–281.0 | Ethanol/acetone. |
| 190 | $(CH_2)_5$ | $C_6H_{11}(CH_2)_3$ | 3HCl | 281.0–281.4 | Do. |
| 191 | $(CH_2)_6$ | $C_6H_{11}(CH_2)_3$ | 3HCl | 274.0–277.0 | Do. |
| 192 | $(CH_2)_7$ | $C_6H_{11}(CH_2)_3$ | 3HCl | 261.2–265.0 | Methanol/acetone. |
| 193 | $(CH_2)_6$ | 2-$HOCH_2C_6H_{10}CH_2$ | 3HCl | 257.8–260.0 | Do. |
| 194 | $(CH_2)_3$ | 2-$NH_2C_6H_4CH_2$ | (*) | 198.2–213.0 | Acetone. |
| 195 | $(CH_2)_6$ | 4-$NH_2C_6H_4CH_2$ | 4HCl | 192.0–200.0 | Methanol/acetone. |
| 196 | $(CH_2)_6$ | 2-$HOC_6H_4CH_2$ | 3HCl | 275.0–296.8 | Do. |

*Tris cyclohexanesulfamate salt.

EXAMPLE 197

N-methyl-N,N-bis-[3-(4-cyclohexylmethyl - 1 - piperidyl) propyl]amine [I: $R_2$ is $4\text{-}CH_2C_6H_{11}$; $R_3$ is H; $R_4$ is $CH_3$; Y is $(CH_2)_3$; $n$ is 2]

A solution of 13.8 g. (0.03 mole) of N,N-bis[3-(4-cyclohexylmethyl-1-piperidyl)propyl]amine in 5 ml. of formic acid was treated with 2.8 ml. (about 0.03 mole) of aqueous formaldehyde. When the initial vigorous reaction had subsided, the mixture was heated on a steam bath for about eight hours. A slight excess of concentrated hydrochloric acid was added, heating was continued for another five hours, and the mixture was basified with aqueous sodium hydroxide and extracted with chloroform. The combined chloroform extracts were taken to dryness and the residue recrystallized from a hexane/acetone mixture giving 5.8 g. of N-methyl-N,N-bis-[3-(4-cyclohexylmethyl - 1 - piperidyl)propyl]amine, M.P. 40.8–41.8° C. (corr.).

EXAMPLES 198–201

The following N-methyl-N,N-bis[(4-cyclohexylmethyl-1-piperidyl)-lower-alkyl]amines of Formula I [$R_2$ is $4\text{-}CH_2C_6H_{11}$; $R_3$ is H; $R_4$ is $CH_3$; $n$ is 2] listed below in Table 11 were prepared using the manipulative procedure described above in Example 197 by reacting the corresponding N,N-bis-[(4-cyclohexylmethyl-1-piperidyl)-lower-alkyl]amine with formaldehyde in formic acid. All melting points are corrected.

TABLE 11

| Example | Y | Base or Salt | M.P. (° C.) | Cryst. from— |
|---|---|---|---|---|
| 198 | $(CH_2)_4$ | 3HCl | >300.0 | Ethanol/acetone. |
| 199 | $(CH_2)_5$ | 3HCl | 299.8–301.8 | Methanol/acetone. |
| 200 | $(CH_2)_6$ | 3HCl | >300.0 | Isopropanol/acetone. |
| 201 | $(CH_2)_7$ | Base | 53.2–54.6 | Methanol/acetone. |

EXAMPLE 202

β-{N,N-bis-[3 - (4 - cyclohexylmethyl-1-piperidyl)propyl] amino}propionamidoxime. [I: $R_2$ is $4\text{-}CH_2C_6H_{11}$; $R_3$ is H; $R_4$ is $CH_2CH_2C(=NOH)NH_2$; Y is $(CH_2)_3$; $n$ is 2]

A mixture of 7.7 g. (0.015 mole) of N-(2-cyanoethyl)-N,N-bis-[3-(4 - cyclohexylmethyl - 1 - piperidyl)propyl] amine (2.11 g., 0.03 mole) of hydroxylamine hydrochloride, and 6.36 g. (0.06 mole) of anhydrous sodium carbonate in 250 ml. of ethanol was heated under reflux with stirring overnight. The mixture was filtered, the filtrate taken to dryness, and the residual oil, which crystallized after standing for several days, was recrystallized from acetone giving 3.1 g. of β-{N,N-[3-(4-cyclohexylmethyl - 1 - piperidyl)propyl]amino}propionamidoxime, M.P. 81.4–85.0° C. (corr.).

EXAMPLE 203

3-(4-cyclohexylmethyl - 1 - piperidyl)propylguanidine hydrobromide [I: $R_2$ is $4\text{-}CH_2C_6H_{11}$; $R_3$ is H; $R_4$ is $C(=NH)NH_2$; Y is $(CH_2)_3$; $n$ is 1]

A mixture of 4.76 g. (0.02 mole) of 3-(4-cyclohexylmethyl-1-piperidyl)propylamine and 3.6 g. (0.02 mole) of 2-methyl-2-thiopseudourea hydrobromide, in about 15 ml. of absolute ethanol, was heated under reflux for about five hours and taken to dryness giving 6.3 g. of a pale yellow gum. The latter was recrystallized several times from acetone giving 3.5 g. of 3-(4-cyclohexylmethyl-1-piperidyl)propylguanidine hydrobromide, M.P. 112.0–113.0° C. (corr.).

EXAMPLE 204

N-(2-cyanoethyl)-N,N - bis - [3-(4 - cyclohexylmethyl-1-piperidyl)propyl]amine [I: $R_2$ is $4\text{-}CH_2C_6H_{11}$; $R_3$ is H; $R_4$ is $CH_2CH_2CN$; Y is $(CH_2)_3$; $n$ is 2]

A mixture of 13.8 g. (0.03 mole) of N,N-bis-[3-(4-cyclohexylmethyl-1-piperidyl)propyl]amine and 10 ml. of acrylonitrile was heated under reflux for about seven hours and taken to dryness in vacuo. The latter was recrystallized once from hexane and twice from acetone giving 11.7 g. of N-(2-cycloethyl)-N,N-bis[3-(4-cyclohexylmethyl-1-piperidyl)propyl]amine, M.P. 48.6–50.8° C. (corr.).

EXAMPLE 205

N-(2 - hydroxyethyl)-N,N-bis-[6-(4 - cyclohexylmethyl-1-piperidyl)hexyl]amine trihydrochloride. [I: $R_2$ is $4\text{-}CH_2C_6H_{11}$; $R_3$ is H; $R_4$ is $CH_2CH_2OH$; Y is $(CH_2)_6$; $n$ is 2]

A mixture of 5.43 g. (0.01 mole) of N,N-bis-[6-(4-cyclohexylmethyl - 1 - piperidyl)hexyl]amine and 0.48 g. (0.01 mole) of ethylene oxide in 150 ml. of dry benzene was heated in an autoclave at 124–129° C. for eight hours and for an additional eight hours at 175–179° C. The reaction mixture was taken to dryness and the residual dark brown viscous oil was triturated with ethanol and a slight excess of ethanolic hydrogen chloride, slurried with acetone and the dark brown gummy solid collected and recrystallized several times from a methanol/acetone mixture giving 4.6 g. of N-(2-hydroxyethyl)-N,N-bis-[6 - (4 - cyclohexylmethyl - 1 - piperidyl)hexyl] amine trihydrochloride, M.P. 276–277° C. (corr.).

EXAMPLE 206

N-[N'-(2,4-dichlorophenyl)thiocarbamyl] - N,N - bis-[6-(4-cyclohexylmethyl - 1 - piperidyl)hexyl]amine dihydrochloride [I: $R_2$ is $4\text{-}CH_2C_6H_{11}$; $R_3$ is H; $R_4$ is $2,4\text{-}(Cl_2C_6H_3)NHCS$; Y is $(CH_2)_6$; $n$ is 2]

To a solution of 2.55 g. (0.03 mole) of 2,4-dichlorophenylisothiocyanate in about 30 ml. of benzene was added 5.43 g. (0.01 mole) of N,N-bis-[6-(4-cyclohexylmethyl-1-piperidyl)-hexyl]amine, and the mixture was allowed to stand at room temperature for about a half hour. The mixture was then treated with 3 ml. of ethanolic hydrogen chloride, diluted first with acetone, and then with ether, and the gummy solid which separated was collected and recrystallized several times from an isopropanol/acetone mixture giving 6.2 g. of N-[N'-(2,4-dichlorophenyl)thiocarbamyl] - N,N - bis-[6 - (4-cyclohexylmethyl - 1 - piperidyl)hexyl]amine dihydrochloride, M.P. 253.0° C. (corr.).

EXAMPLES 207–211

The following N-($R_4$)-N,N-bis[(4-cyclohexylmethyl-1-piperidyl)-lower-alkyl]amines of formula I [$R_2$ is $4\text{-}CH_2C_6H_{11}$; $R_3$ is H; $n$ is 2] listed below in Table 12 were prepared by reaction of an appropriate isocyanate with an appropriate N,N-bis-[(4-cyclohexylmethyl-1-piperidyl)-lower-alkyl]amine ($R_4$ is H) using the manipulative procedure described above in Example 206. The data is given for the free bases in each case, and all melting points are corrected.

TABLE 12

| Example | Y | $R_4$ | M.P. (° C.) | Crystd. from— |
|---|---|---|---|---|
| 207 | $(CH_2)_6$ | $C_6H_5NHCO$ | 76.4–77.2 | Acetone. |
| 208 | $(CH_2)_6$ | $C_6H_{11}NHCO$ | 86.8–88.2 | Do. |
| 209 | $(CH_2)_6$ | $CH_3(CH_2)_3NHCO$ | 83.0–84.5 | Do. |
| 210 | $(CH_2)_7$ | $CH_3(CH_2)_3NHCO$ | 60.4–61.4 | Do. |
| 211 | $(CH_2)_3$ | (*) | 225.0 | Methanol. |

*$R_4$ is $4\text{-}CONH\text{-}3\text{-}CH_3C_6H_3\text{-}C_6H_3\text{-}3'\text{-}CH_3\text{-}4'\text{-}NHCO$; $n$ is 1.

EXAMPLE 212

N-(α,α,γ - trimethyl-β-oxovaleroyl)-N,N-bis-[6-(4-cyclohexylmethyl-1-piperidyl)hexyl]amine dihydrochloride [I: $R_2$ is $4\text{-}CH_2C_6H_{11}$; $R_3$ is H; $R_4$ is $(CH_3)_2CHCOC(CH_3)_2CO$; Y is $(CH_2)_6$; $n$ is 2]

A mixture of 10.5 g. (0.02 mole) of N,N-bis-[6-(4-cyclohexylmethyl-1-piperidyl)hexyl]amine and 50 ml. of α,α-dimethyl-β-isopropylidenylbutyrolactone was heated on a steam bath for seven hours. The mixture was then taken to dryness in vacuo, the residue dissolved in ethanol and the solution acidified with ethanolic hydrogen chloride and diluted with ether. Several recrystallizations from acetone of the solid which separated afforded 5.5 g. of N-(α,α,γ - trimethyl-β-oxovaleroyl)-N,N-bis-[6-(4-cyclohexylmethyl - 1-piperidyl)hexyl]amine dihydrochloride, M.P. 211.0–214.0° C. (corr.).

EXAMPLE 213

N - (4 - nitrobenzyl)-N,N-bis-[6-(4-cyclohexylmethyl-1-piperidyl)-hexyl]amine trihydrochloride [I: $R_2$ is 4-$CH_2C_6H_{11}$; $R_3$ is H; $R_4$ is 4-$NO_2C_6H_4CH_2$; Y is $(CH_2)_6$; n is 2]

A mixture of 5.43 g. (0.01 mole) of N,N-bis-[6-(4-cyclohexylmethyl-1-piperidyl)hexyl]amine, 2.55 g. (0.015 mole) of 4-nitrobenzyl chloride, and 2.12 g. (0.02 mole) of sodium carbonate in 70 ml. of absolute ethanol was heated under reflux for four hours. The mixture was taken to dryness, the residue dissolved in a benzene/ether mixture, the organic solution decanted from the solid residue and extracted with dilute hydrochloric acid. The aqueous layer of the resulting three-phase system was discarded, and the middle layer was dissolved in chloroform, extracted with sodium bicarbonate, washed with water, dried and taken to dryness. The residual orange gum was dissolved in a small amount of ethanol and treated with an excess of ethanolic hydrogen chloride. Dilution of the mixture with ether afforded the crude product in solid form which was collected and recrystallized from methanol giving 2.7 g. of N-(4-nitrobenzyl)-N,N-bis-[6-(4-cyclohexylmethyl-1-piperidyl) - hexyl]amine trihydrochloride, M.P. 231.0–233.0° C. (corr.).

EXAMPLE 214

N - (2-aminobenzoyl)-N,N-bis-[3-(4-cyclohexylmethyl-1-piperidyl)propyl]amine trihydrochloride [I: $R_2$ is 4-$CH_2C_6H_{11}$; $R_3$ is H; $R_4$ is 2-$NH_2C_6H_4CO$; Y is $(CH_2)_3$; n is 2]

A mixture of 11.6 g. (0.02 mole) of N,N-bis-[3-(4-cyclohexylmethyl-1-piperidyl)propyl]amine and 4.4 g. (0.03 mole) of isatoic anhydride in about 100 ml. of benzene was heated under reflux for three hours and then taken to dryness. The residue was dissolved in 200 ml. of methanol, cooled overnight in a cold room, and the solid material which separated was collected to give 6.1 g. of N-(2-carboxyphenylaminocarbonyl)-N,N-bis-[3-(4-cyclohexylmethyl-1-piperidyl)propyl]amine as a by-product. Concentration of the filtrate to a small volume and further cooling afforded a second crop of 1.0 g. of the same by-product.

The filtrate obtained after collection of the above-named by-product was concentrated to a small volume, acidified with 6.0 ml. of 7.33 N ethanolic hydrogen chloride, diluted strongly with ether, and the hydrochloride salt which separated was collected and dried to give 7.2 g. of crude material.

The latter was dissolved in chloroform and reconverted to the free base by washing with dilute sodium carbonate and water and drying the chloroform solution containing the free base over anhydrous calcium sulfate. The solution was then rendered 2% in isopropylamine by addition of 6.0 ml. of the latter and treated three times with stirring for fifteen minutes with 5.0, 10.0, and 15.0 g. batches of silica gel, filtering the solution each time from the adsorbent.

The solution was then taken to dryness once again, the residue was dissolved in absolute ethanol, and the solution acidified with excess ethanolic hydrogen chloride. Dilution of the solution with acetone and ether caused the separation of a solid material which was collected and recrystallized from isopropanol/acetone to give 3.4 g. of N-(2-aminobenzoyl)-N,N-bis-[3-(4-cyclohexylmethyl-1-piperidyl)propyl]amine trihydrochloride, M.P. 240.0–260.0° C. (indef., corr.).

EXAMPLE 215

N - (4-aminobenzoyl)-N,N-bis-[6-(4-cyclohexylmethyl-1-piperidyl)hexyl]amine dihydrochloride [I: $R_2$ is 4-$CH_2C_6H_{11}$; $R_3$ is H; $R_4$ is 4-$NH_2C_6H_4CO$; Y is $(CH_2)_6$; n is 2]

N - (4 - nitrobenzoyl)-N,N-bis-[6-(4-cyclohexylmethyl-1-piperidyl)hexyl]amine dihydrochloride (10.8 g., 0.014 mole) was dissolved in 250 ml. of absolute ethanol and reduced over 0.2 g. of platinum oxide catalyst under an initial hydrogen pressure of 60 pounds p.s.i. at room temperature. After an uptake of the theoretical amount of hydrogen, the catalyst was removed by filtration, and the filtrate evaporated to a volume of about 50 ml. The solid which separated on cooling was collected and dried giving 3.2 g. of N-(4-aminobenzoyl)-N,N-bis-[6-(4-cyclohexylmethyl - 1-piperidyl)hexyl]amine dihydrochloride, M.P. 241.6–243.0° C. (corr.).

EXAMPLE 216

N - (3,5 - diaminobenzoyl) - N,N - bis-[6-(4-cyclohexylmethyl - 1 - piperidyl)hexyl]amine dihydrochloride [I: $R_2$ is 4-$CH_2C_6H_{11}$; $R_3$ is H; $R_4$ is 3,5-$(NH_2)_2C_6H_3CO$; Y is $(CH_2)_6$; n is 2]

N - (3,5 - dinitrobenzoyl) - N,N-bis - [6 - (4 - cyclohexylmethyl - 1 - piperidyl(hexyl]amine dihydrochloride (19.1 g., 0.024 mole) was dissolved in 250 ml. of ethanol and reduced over 0.6 g. of platinum oxide catalyst under an initial hydrogen pressure of 60 pounds p.s.i. and at a temperature of from 28 to 42° C. After a total uptake of the theoretical amount of hydrogen, the catalyst was removed by filtration, and filtrate evaporated to a small volume and cooled. The solid which separated was collected and dried giving 5.5 g. of N-(3,5-diaminobenzoyl)-N,N - bis-[6-(4-cyclohexylmethyl-1-piperidyl)hexyl]amine dihydrochloride, M.P. 250.0–252.0° C.

EXAMPLE 217

N - (3 - amino - 4 - chlorobenzoyl) - N,N - bis - [6 - (4 - cyclohexylmethyl - 1 - piperidyl)hexyl]amine dihydrochloride [I: $R_2$ is 4-$CH_2C_6H_{11}$; $R_3$ is H; $R_4$ is 3-$NH_2$-4-$ClC_6H_3CO$; Y is $(CH_1)_6$; n is 2]

N - (3 - nitro - 4 - chlorobenzoyl) - N,N - bis - [6 - (4 - cyclohexylmethyl-1-piperidyl)hexyl]amine dihydrochloride (21.7 g., 0.03 mole) was dissolved in 250 ml. of absolute ethanol and reduced over 0.6 g. of a platinum oxide catalyst at an initial hydrogen pressure of 60 pounds p.s.i. at room temperature. After a total uptake of the theoretical amount of hydrogen, the catalyst was removed by filtration, and the filtrate taken to dryness. The residue was recrystallized several times from a methanol/acetone/ether mixture and once from acetone alone giving 3.4 g. of N - (3-amino - 4 - chlorobenzoyl) - N,N-bis-[6-(4-cyclohexylmethyl - 1-piperidyl)hexyl]amine dihydrochloride, M.P. 205.4–207.6° C. (corr.).

EXAMPLE 218

N - (4 - acetylaminobenzoyl) - N,N - bis - [6 - (4 - cyclohexylmethyl - 1 - piperidyl)hexyl]amine dihydrochloride [I: $R_2$ is 4-$CH_2C_6H_{11}$; $R_3$ is H; $R_4$ is 4-$CH_3CONHC_6H_4CO$; Y is $(CH_2)$; n is 2]

A suspension of 8.4 g. (0.01 mole) of N-(4-aminobenzoyl) - N,N-bis - [6 - (4 - cyclohexylmethyl - 1 -piperidyl)hexyl]-amine dihydrochloride is about 120 ml. of pyridine was treated with 2.65 g. (0.026 mole) of acetic anhydride and warmed on a steam bath for about three hours. The reaction mixture was taken to dryness, the residue extracted with boiling acetone and the combined acetone extracts evaporated to a volume of about 50 ml. The solid which separated was recrystallized once from methanol/ether and once from acetone/methanol to give 5.4 g. of N-(4-acetylaminobenzoyl)-N,N-bis-[6-(4- cyclohexylmethyl - 1 - piperidyl)hexyl]amine dihydrochloride, M.P. 185.0–189.0° C. (corr.).

EXAMPLE 219

*N - (3, 5 - diacetylaminobenzoyl) - N,N - bis - [6 - (4 - cyclohexylmethyl - 1 - piperidyl)hexyl]amine dihydrochloride* [I: $R_2$ is 4-$CH_2C_6H_{11}$; $R_3$ is H; $R_4$ is 3,5-$(CH_3CONH)_2C_6H_3CO$; Y is $(CH_2)_6$; $n$ is 2]

A mixture of 9.7 g. (0.013 mole) of N-(3,5-diaminobenzoyl) - N,N - bis - [6 - (4 - cyclohexylmethyl - 1 - piperidyl)hexyl]amine dihydrochloride and 5.01 g. (0.05 mole) of acetic anhydride in about 200 ml. of pyridine was heated on a steam bath for one hour, and then taken to dryness in vacuo. The residue was extracted with methanol/acetone and the combined extracts concentrated to a volume of about 200 ml. and diluted with ether. The solid which separated was recrystallized from an isopropanol/acetone mixture giving 3.9 g. of N-(3,5-diacetylaminobenzoyl)-N,N-bis-[6-(4-cyclohexylmethyl - 1 - piperidyl) - hexyl]amine dihydrochloride, M.P. 225.0–226.0° C. (corr.).

EXAMPLE 220

*N - (N′,N′ - diethylaminocarbonyl) - N,N - bis - [6 - (4 - cyclohexylmethyl - 1 - piperidyl)hexyl]amine* [I: $R_2$ is 4—$CH_2C_6H_{11}$; $R_3$ is H; $R_4$ is $(C_2H_5)_2NCO$; Y is $(CH_2)_6$; $n$ is 2]

By reacting N,N-bis - [6 - (4 - cyclohexylmethyl - 1 - piperidyl)hexyl]amine with N,N-diethylcarbamyl chloride in the presence of sodium carbonate, there can be obtained N - (N′,N′ - diethylaminocarbonyl) - N,N - bis - [6 - (4 - cyclohexylmethyl - 1 - piperidyl)hexyl]amine.

EXAMPLES 221–225

By following the manipulative procedure described above in Example 220 substituting for the N,N-diethylcarbamyl chloride used therein a molar equivalent amount of N,N-diethylthiocarbamyl chloride, piperidinocarbonyl chloride, pyrrolidinocarbonyl chloride, piperidinothiocarbonyl chloride, or pyrrolidinothiocarbonyl chloride, there can be obtained the respective compounds of Examples 221–225 listed below in Table 13 where, in each case $R_2$ is 4—$CH_2C_6H_{11}$; $R_3$ is H; Y is $(CH_2)_6$; and $n$ is 2.

TABLE 13

| Example | $R_4$ |
|---|---|
| 221 | $(C_2H_5)_2NCS$ |
| 222 | $C_5H_{10}NCO$ |
| 223 | $C_4H_8NCO$ |
| 224 | $C_5H_{10}NCS$ |
| 225 | $C_4H_8NCS$ |

EXAMPLE 226

*4 - {3 - [4 - (N - methylcarbamyl) - 1 - piperidyl]propylamino} - 7 - chloroquinoline* [IIa: $R_1$ is 7-Cl; $R_2$ is 4—$CONHCH_3$; $R_3$ is H; Y is $(CH_2)_3$; $n$ is 1]

A mixture of 11.9 g. (0.06 mole) of 4,7-dichloroquinoline, 17.9 g. (0.09 mole) of 3-[4-(N-methylcarbamyl)-1-piperidyl]propylamine, and 35 g. of phenol was heated with stirring at 115–125° C. for twenty-four hours. The mixture, while still warm, was dissolved in 300 ml. of chloroform and the solution extracted with three 100 ml. portions of 10% hydrochloric acid. The combined acid extracts were basified with concentrated ammonium hydroxide, extracted with chloroform, and the chloroform extracts dried over Drierite ® and taken to dryness. The residue was dissolved in 10% acetic acid, filtered and the filtrate basified with concentrated ammonium hydroxide. The brown gum which separated was washed by decantation with water, triturated with ethyl acetate and the resulting solid was collected and recrystallized from an ethanol/ethyl acetate mixture giving 9.4 g. of 4 - {3 - [4 - (N - methylcarbamyl) - 1 - piperidyl]propylamino} - 7 - chloroquinoline, M.P. 174.8–175.4° C. (corr.).

EXAMPLES 227–232

The following compounds of Formula IIa listed below in Table 14 were prepared according to the manipulative procedure described above in Example 226, using 4,7-dichloroquinoline and an appropriate mono- or bis-[(1-piperidyl)-propyl]amine. In each case $R_1$ is 7-Cl, $R_3$ is H, and Y is $(CH_2)_3$. All melting points are corrected.

TABLE 14

| Example | $R_2$ | $n$ | M.P. (° C.) | Cryst. from— |
|---|---|---|---|---|
| 227 | 4-$CONH_2$ | 1 | 217.4–219.6 | Ethanol/ethyl acetate. |
| 228 | 4-$CONHC_2H_5$ | 1 | 188.2–188.8 | Do. |
| 229 | 4-$CON(CH_3)_2$ | 1 | 187.2–188.4 | Acetone. |
| 230 | 4-$CON(C_2H_5)_2$ | 1 | 140.0–140.6 | Ethyl acetate/hexane. |
| 231 | 4-$CONHCH_3$ | 2 | 164.0–165.0 | Ethanol/ethyl acetate. |
| 232 | 4-$CONHC_2H_5$ | 2 | 165.4–166.2 | Do. |

EXAMPLES 233–256

By following the manipulative procedure described above in Example 226, substituting for the 4,7-dichloroquinoline and the 3-[4-N-methylcarbamyl)-1-piperidyl] propylamine used therein, molar equivalent amounts of an appropriate 4-halo-substituted-quinoline and an appropriate mono- or bis-[(substituted-1-piperidyl)-loweralkyl]amine, there can be obtained the 4-{mono- or bis-[(substituted - 1 - piperidyl) - lower - alkyl]amino}-substituted-quinolines of Formula IIa listed below in Table 15:

TABLE 15

| Example | Y/$R_1$ | $R_2$/$R_3$ | $n$ |
|---|---|---|---|
| 233 | $(CH_2)_3$ / 5-$CH_3O$ | 4-$CH_2OH$ | 1 |
| 234 | $(CH_2)_3$ / 7-$CH_3S$ | 4-$CH_2CH_2CH_2OH$ | 1 |
| 235 | $(CH_2)_2$ / 7-$CH_3SO$ | 4-HO / 2,6-di-$CH_3$ | 1 |
| 236 | $(CH_2)_5$ / 7-$CH_3SO_2$ | 4-HO / 2,2,4,6,6-penta-$CH_3$ | 1 |
| 237 | $(CH_2)_3$ / 7-$C_6H_5CH_2O$ | 4-HO / 2,2-di-$CH_3$-6-$(CH_3)_2$CHCH$_2$ | 1 |
| 238 | $(CH_2)_3$ / 7-(4-Cl$C_6H_4CH_2O$) | 4-$(CH_2)_6$OH | 1 |
| 239 | $(CH_2)_3$ / 7-(4-HO$C_6H_4CH_2O$) | 4-NHCHO | 1 |
| 240 | $(CH_2)_3$ | 4-NHCOCH$(C_2H_5)CH_2CH_3$ | |
| 241 | 7-(3,4-O$CH_2OC_6H_3CH_2O$) / $(CH_2)_3$ | 3-CONHCH$_2$CH$_2$CH$_2$CH$_3$ | 1 |
| 242 | 7-(3-$CH_3C_6H_4CH_2O$) / $(CH_2)_3$ | 4-$CONH_2$ | 1 |
| 243 | 7-(3-$CH_3SO_2C_6H_4CH_2O$) / $(CH_2)_3$ | 4-$CONH_2$ | 1 |
| 244 | $(CH_2)_3$ / 5-$CH_3O$ | 4-$CON(CH_3)_2$ | 2 |
| 245 | $(CH_2)_3$ / 7-$CH_3S$ | 4-$CH_2OH$ | 2 |

TABLE 15—Continued

| Example | Y/R₁ | R₂/R₃ | n |
|---|---|---|---|
| 246 | (CH₂)₃ / 7-CH₃SO | 4-CH₂CH₂CH₂OH | 2 |
| 247 | (CH₂)₂ / 7-CH₃SO₂ | 4-HO | 2 |
| 248 | (CH₂)₅ | 2,6-di-CH₃ / 4-HO | 2 |
| 249 | 7-C₆H₅CH₂CH₂O / (CH₂)₃ | 2,2,4,6,6-penta-CH₃ / 4-HO | 2 |
| 250 | 7-(4-ClC₆H₄CH₂CH₂O) / (CH₂)₃ | 2,2-di-CH₃-6-(CH₃)₂CHCH₂ / 4-(CH₂)₆OH | 2 |
| 251 | 7-(4-HOC₆H₄CH₂CH₂O) / (CH₂)₃ | 4-NHCHO | 2 |
| 252 | 7-(3,4-OCH₂OC₆H₃CH₂CH₂O) / (CH₂)₃ | 4-NHCOCH(C₂H₅)CH₂CH₃ | 2 |
| 253 | 7-(3-CH₃C₆H₄CH₂CH₂O) / (CH₂)₃ | 3-CONHCH₂CH₂CH₂CH₃ | 2 |
| 254 | 7-(2-CH₃OC₆H₄CH₂CH₂O) / (CH₂)₃ | 4-CONH₂ | 2 |
| 255 | (CH₂)₃ | 4-CH₂C₆H₅ | 2 |
| 256 | (CH₂)₃ | 4-CH₂C₆H₁₁ | 2 |

EXAMPLE 257

*2-[3-(4-carbamyl-1-piperidyl)propylamino]quinoline*
[IIb: R₁ is H; R₂ is 4-CONH₂; R₃ is H; n is 1]

By reacting 2-chloroquinoline with 3-(4-carbamyl-1-piperidyl)propylamine according to the manipulative procedure described above in Example 226 there can be obtained 2-[3-(4 - carbamyl - 1 - piperidyl)propylamino] quinoline.

EXAMPLES 258–271

By following the manipulative procedure described above in Example 226, substituting for the 4,7-dichloroquinoline and the 3-[4-(N-methylcarbamyl)-1-piperidyl] propylamine used therein, molar equivalent amounts of an appropriate 2-halo-substituted-quinoline and an appropriate (substituted-1-piperidyl)-lower-alkylamine, there can be obtained the 2-[(substituted-1-piperidyl)-lower-alkylamino]-substituted-quinolines of Formula IIb (n is 1) listed below in Table 16:

TABLE 16

| Ex. | Y/R₁ | R₂/R₃ |
|---|---|---|
| 258 | (CH₂)₃ / 7-Cl | 4-CONHCH₃ |
| 259 | (CH₂)₃ / 7-Cl | 4-CONHC₂H₅ |
| 260 | (CH₂)₃ / 7-Cl | 4-CON(CH₃)₂ |
| 261 | (CH₂)₃ / 7-Cl | 4-CON(C₂H₅)₂ |
| 262 | (CH₂)₃ / 5-CH₃O | 4-CH₂OH |
| 263 | (CH₂)₃ / 7-CH₃S | 4-CH₂CH₂CH₂OH |
| 264 | (CH₂)₂ / 7-CH₃SO | 4-HO |
| 265 | (CH₂)₅ / 7-CH₃SO₂ | 2,6-di-CH₃ / 4-HO |
| 266 | (CH₂)₃ / 7-C₆H₅CH₂O | 2,2,4,6,6-penta-CH₃ / 4-HO |
| 267 | (CH₂)₃ / 7-(4-ClC₆H₄CH₂O) | 2,2-di-CH₃-6-(CH₃)₂CHCH₂ / 4-(CH₂)₆OH |
| 268 | (CH₂)₃ / 7-(4-HOC₆H₄CH₂O) | 4-NHCHO |
| 269 | (CH₂)₃ | 4-NHCOCH(C₂H₅)CH₂CH₃ |
| 270 | 7-(3,4-OCH₂OC₆H₃CH₂O) / (CH₂)₃ | 3-CONHCH₂CH₂CH₂CH₃ |
| 271 | 7-(3-CH₃C₆H₄CH₂O) / (CH₂)₃ / 7-(3-CH₃SO₂C₆H₄CH₂O) | 4-CONH₂ |

EXAMPLES 272–286

By following the manipulative procedure described above in Example 226 for the 4,7-dichloroquinoline and the 3-[4-(N-methylcarbamyl) - 1 - piperidyl]propylamine used therein, molar equivalent amounts of an appropriate 2-halo-substituted-quinoline and an appropriate bis-[(substituted-1-piperidyl)-lower-alkyl]amine, there can be obtained the 2-{bis-[(substituted-1-piperidyl)-lower-alkyl]amino}-substituted-quinolines of Formula IIb (n is 2) listed below in Table 17:

TABLE 17

| Ex. | Y/R₁ | R₂/R₃ |
|---|---|---|
| 272 | (CH₂)₃ / 7-Cl | 4-CONHCH₃ |
| 273 | (CH₂)₃ / 7-Cl | 4-CONHC₂H₅ |
| 274 | (CH₂)₃ / 5-CH₃O | 4-CON(CH₃)₂ |
| 275 | (CH₂)₃ / 7-CH₃S | 4-CH₂OH |
| 276 | (CH₂)₃ / 7-CH₃SO | 4-CH₂CH₂CH₂OH |
| 277 | (CH₂)₂ / 7-CH₃SO₂ | 4-HO |
| 278 | (CH₂)₅ | 2,6-di-CH₃ / 4-HO |
| 279 | 7-C₆H₅CH₂CH₂O / (CH₂)₃ | 2,2,3,6,6-penta-CH₃ / 4-HO |
| 280 | 7-(4-ClC₆H₄CH₂CH₂O) / (CH₂)₃ | 2,2-di-CH₃-6-(CH₃)₂CHCH₂ / 4-(CH₂)₆OH |
| 281 | 7-(4-HOC₆H₄CH₂CH₂O) / (CH₂)₃ | 4-NHCHO |
| 282 | 7-(3,4-OCH₂OC₆H₃CH₂CH₂O) / (CH₂)₃ | 4-NHCOCH(C₂H₅)CH₂CH₃ |
| 283 | 7-(3-CH₃C₆H₄CH₂CH₂O) / (CH₂)₃ | 3-CONHCH₂CH₂CH₂CH₃ |
| 284 | 7-(2-CH₃OC₆H₄CH₂CH₂O) / (CH₂)₃ | 4-CONH₂ |
| 285 | (CH₂)₃ | 4-CH₂C₆H₅ |
| 286 | (CH₂)₃ | 4-CH₂C₆H₁₁ |

Our new (1-piperidyl)-lower-alkylamines of Formula I showed anti-inflammatory activity in one or more of three different test procedures, viz, inhibition of granuloma pouch formation in rats, inhibition of dextran-induced local foot edema in rats, and inhibition of para-influenza (Sendai strain) virus-induced lung inflammation in mice. Data obtained for representative compounds of the series are given in Table 18 which follows. The activities are given in terms of the minimum dose (MIND) which is defined as the smallest dose producing 30% inhibition of the inflammation in the lung inflammation and dextran edema tests and 40% inhibition in the granuloma pouch test. The symbols G.P., L.I., and D.E. represent the tests named above, namely the granuloma pouch, lung inflammation, and dextran edema tests, respectively, while the designations s.c. and p.o. represent subcutaneous and peroral routes of administration, respectively.

TABLE 18

| Example | G.P. | L.I. | D.E. |
|---|---|---|---|
| 46 | 25 (s.c.) | 100 (s.c.) | |
| 47 | | 25 (s.c.) | |
| 62 | | 100 (p.o.) | 6.25 (s.c.) |
| | | 6.25 (s.c.) | |
| 63 | 25 (p.o.) | 1.56 (s.c.) | 1.56 (s.c.) |
| | | 25 (s.c.) | 100 (p.o.) |
| 67 | 1.56 (s.c.) | 100 (s.c.) | |
| 69 | 0.4 (s.c.) | | |
| | 25 (p.o.) | | |
| 70 | 0.40 (s.c.) | 1.56 (s.c.) | |
| 71 | | 1.56 (s.c.) | |
| 72 | 0.10 (s.c.) | 1.56 (s.c.) | |
| | | 100 (p.o.) | |
| 73 | 0.10 (s.c.) | | |
| 84 | 0.10 (s.c.) | 6.25 (s.c.) | |
| | 6.25 (p.o.) | | |
| 85 | 0.40 (s.c.) | 6.25 (s.c.) | |
| 86 | | 1.56 (s.c.) | |
| 87 | 0.40 (s.c.) | 6.25 (s.c.) | |
| | | 25 (p.o.) | |
| 89 | | 6.25 (s.c.) | |
| 90 | | 6.25 (s.c.) | |
| 91 | | 6.25 (s.c.) | |
| 92 | | 1.56 (s.c.) | |
| 95 | 100 (p.o.) | 6.25 (s.c.) | |
| | | 100 (p.o.) | |
| 98 | 100 (p.o.) | | |
| 100 | 100 (p.o.) | 6.25 (s.c.) | |
| 102 | | 6.25 (s.c.) | |
| 105 | | 100 (p.o.) | |
| 106 | 0.40 (s.c.) | | |
| 107 | 0.40 (s.c.) | 6.25 (s.c.) | |
| 108 | | 25 (s.c.) | |
| 110 | 0.10 (s.c.) | 1.56 (s.c.) | |
| 111 | 100 (p.o.) | 6.25 (s.c.) | |
| 112 | 100 (p.o.) | | |
| 114 | | 6.25 (s.c.) | |
| 115 | | 6.25 (s.c.) | |
| 123 | 0.4 (s.c.) | 100 (p.o.) | 100 (p.o.) |
| 124 | 6.25 (s.c.) | 100 (s.c.) | |
| 125 | | 25 (s.c.) | |
| 126 | 1.56 (s.c.) | 6.25 (s.c.) | |
| 127 | | 25 (s.c.) | |
| 129 | 6.25 (s.c.) | 25 (s.c.) | |
| 130 | | 6.25 (s.c.) | |
| | | 100 (p.o.) | |
| 132 | | 25 (s.c.) | |
| 133 | | 25 (s.c.) | |
| 136 | | 25 (s.c.) | |
| 140 | | 6.25 (s.c.) | |
| 142 | 25 (s.c.) | 25 (s.c.) | |
| | 100 (p.o.) | | |
| 145 | 100 (p.o.) | | |
| 147 | 0.25 (s.c.) | 6.25 (s.c.) | |
| | | 100 (p.o.) | |
| 148 | | 0.40 (s.c.) | |
| 149 | | 6.25 (s.c.) | |
| 150 | | 6.25 (s.c.) | |
| 152 | | 25 (s.c.) | |
| | | 100 (p.o.) | |
| 155 | | 6.25 (s.c.) | |
| | | 100 (p.o.) | |
| 156 | | 1.56 (s.c.) | |
| 157 | | 1.56 (s.c.) | |
| 164 | | 6.25 (s.c.) | |
| 165 | | 6.25 (s.c.) | |
| | | 25 (p.o.) | |
| 166 | | 1.56 (s.c.) | |
| 168 | | 100 (p.o.) | |
| 169 | 0.40 (s.c.) | 6.25 (s.c.) | |
| | 100 (p.o.) | | |
| 170 | 0.10 (s.c.) | | |
| 172 | | 1.56 (s.c.) | |
| 173 | 0.40 (s.c.) | 1.56 (s.c.) | |
| | 25 (p.o.) | 25 (s.c.) | |
| 174 | 0.10 (s.c.) | 6.25 (s.c.) | |
| | 25 (p.o.) | 25 (p.o.) | |
| 175 | | 1.56 (s.c.) | |
| 176 | 0.40 (s.c.) | 1.56 (s.c.) | |
| | 25 (p.o.) | 6.25 (p.o.) | |
| 177 | | 6.25 (s.c.) | |
| 178 | 0.40 (s.c.) | 6.25 (s.c.) | |
| | 6.25 (p.o.) | 25 (p.o.) | |
| 179 | | 1.56 (s.c.) | |
| 180 | 25 (p.o.) | 6.25 (s.c.) | |
| 182 | 0.40 (s.c.) | | |
| | 25 (p.o.) | | |
| 184 | | 6.25 (s.c.) | |
| 197 | | 1.56 (s.c.) | |
| 198 | 0.40 (s.c.) | 0.40 (s.c.) | |
| 199 | 0.40 (s.c.) | 1.56 (s.c.) | |
| | | 25 (p.o.) | |
| 200 | 1.56 (s.c.) | 0.40 (s.c.) | |
| | | 25 (p.o.) | |
| 201 | 0.025 (s.c.) | 1.56 (s.c.) | |
| | | 25 (p.o.) | |
| 203 | | 100 (s.c.) | |
| 204 | 100 (p.o.) | 25 (s.c.) | |
| | | 100 (p.o.) | |

In addition to having anti-inflammatory activity, our new (1-piperidyl)-lower-alkylamines showed hypotensive activity in renal hypertensive rats. Data, expressed either in terms of the Average Effective Dose (AED) or the Minimum Effective Hypotensive Dose (MEHD), so-obtained for representative compounds in the series are given in Table 19 below.

TABLE 19

| Example | Activity |
|---|---|
| 33 | MEHD=1.0 mg./kg. (s.c.). |
| 35 | MEHD=1.0 mg./kg. (s.c.). |
| 39 | AED=90 mg./kg. (s.c.). |
| 62 | AED=40 mg./kg. (s.c.). |
| 63 | AED=3 mg./kg. (p.o.). |
| 64 | AED=40 mg./kg. (s.c.). |
| 65 | AED=90 mg./kg. (p.o.). |
| 69 | AED=15 mg./kg. (s.c.). |
| 70 | AED=2 mg./kg. (s.c.). |
| 71 | AED=50 mg./kg. (p.o.). |
| 202 | AED=6 mg./kg. (s.c.). |

The compounds of the Formula I have also been shown to possess coronary dilator activity when tested in the isolated rabbit heart. Coronary dilator activity data so-obtained for representative compounds of the series are given in Table 20 below. The activities are expressed either in terms of the Effective Dose ($ED_{50}$) or in terms of the percent dilatation, at a given dose level, the doses in both cases being expressed in terms of the dose per heart.

TABLE 20

| Example | Activity |
|---|---|
| 32 | 1.8% dilatation at 0.1 mg. |
| 42 | $ED_{50}$=87 mcg.; 164% of papaverine. |
| 44 | $ED_{50}$=50 mcg.; 284% of papaverine. |
| 47 | $ED_{50}$=33.5 mcg.; 424% of papaverine. |
| 62 | 24.7% dilatation at 0.05 mg. |
| 69 | $ED_{50}$=90 mcg.; 63% of papaverine. |
| 71 | 41% dilatation at 8 mcg. |
| 89 | $ED_{50}$=6.1 mcg.; 2328% of papaverine. |
| 90 | 25% dilatation at 50 mcg. |
| 102 | 23% dilatation at 50 mcg. |
| 153 | $ED_{50}$=10.8 mcg.; 1315% of papaverine. |
| 154 | 12% dilatation at 50 mcg. |
| 164 | 13% dilatation at 50 mcg. |
| 169 | 12% dilatation at 100 mcg. |
| 172 | $ED_{50}$=6.6 mcg.; 2152% of papaverine. |
| 173 | 19% dilatation at 100 mcg. |
| 178 | 34% dilatation at 100 mcg. |
| 179 | $ED_{50}$=5.7 mcg.; 2500% of papaverine. |
| 180 | $ED_{50}$=4.2 mcg.; 3380% of papaverine. |
| 181 | $ED_{50}$=8.2 mcg.; 1732% of papaverine. |
| 182 | $ED_{50}$=10.1 mcg.; 1420% of papaverine. |
| 197 | 21% dilatation at 50 mcg. |

The compounds of Formula I have also been shown to have tranquilizer activity as determined in mice using standard activity cages. Tranquilizer activity data so-obtained for representative compounds of the series are given below in Table 21. The data are given in terms of the percentage decrease in the animals' activity at a particular dose level.

TABLE 21

| Example | Activity |
|---|---|
| 38 | 53% decrease at 64 mg./kg. (i.p.) |
| 44 | 87% decrease at 100 mg./kg. (p.o.) |
| 73 | 54% decrease at 300 mg./kg. (p.o.) |
| 89 | 59% decrease at 300 mg./kg. (p.o.) |

| Example | Activity |
|---|---|
| 90 | 76% decrease at 16 mg./kg. (p.o.) |
| 172 | 71% decrease at 100 mg./kg. (p.o.) |
| 173 | 90% decrease at 300 mg./kg. (p.o.) |
| 177 | 58% decrease at 100 mg./kg. (p.o.) |
| 178 | 75% decrease at 100 mg./kg. (p.o.) |
| 179 | 76% decrease at 100 mg./kg. (p.o.) |
| 181 | 86% decrease at 300 mg./kg. (p.o.) |
| 182 | 71% decrease at 300 mg./kg. (p.o.) |
| 197 | 71% decreases at 300 mg./kg. (p.o.) |
| 198 | 69% decrease at 10 mg./kg. (p.o.) |
| 199 | 65% decrease at 100 mg./kg. (p.o.) |
| 201 | 72% decrease at 300 mg./kg. (p.o) |

The Average Effective Dose$_{50}$ (AED$_{50}$) of 4-<N,N- possess anthelmintic activity when administered orally to Swiss mice infected by the tapeworm, *Hymenolepis nana*, and the pinworm, *Aspicularis tetraptera*. Data so-obtained with representative compounds are given below in Table 22 and are expressed in terms of the dose, in mg./kg./day administered two times a day for four days, required to clear all of the animals in the test group of each of the test organisms.

TABLE 22

| Example | Dose (mg./kg./day) | |
|---|---|---|
| | Hy. nana | Asp. tetraptera |
| 72 | 50 | 50 |
| 73 | 25 | |
| 88 | 200 | 200 |
| 91 | 400 | |
| 94 | 400 | 400 |
| 100 | | 400 |
| 104 | 400 | 200 |
| 110 | 100 | 100 |
| 112 | 200 | 200 |
| 113 | 200 | 100 |
| 114 | 400 | |
| 115 | 400 | |
| 117 | 200 | 200 |
| 118 | 200 | 400 |
| 119 | 200 | |
| 120 | 400 | 400 |
| 139 | 200 | 200 |
| 140 | 200 | |
| 141 | 200 | |
| 142 | 400 | |
| 146 | | 400 |
| 148 | 50 | |
| 150 | 50 | 50 |
| 153 | 50 | |
| 155 | 100 | |
| 158 | 50 | 50 |
| 159 | 100 | |
| 166 | 200 | 200 |
| 167 | 50 | 50 |
| 176 | 50 | |
| 178 | 50 | 50 |
| 179 | 50 | 50 |
| 182 | | 25 |
| 185 | 50 | 100 |
| 188 | 200 | 200 |
| 190 | 50 | 50 |
| 191 | 100 | 100 |
| 192 | 100 | 100 |
| 193 | 50 | 25 |
| 195 | 50 | 50 |
| 199 | 25 | 50 |
| 200 | 50 | 50 |
| 202 | 50 | 100 |
| 205 | 50 | 50 |
| 206 | 200 | 100 |
| 207 | 100 | 100 |
| 208 | 200 | 100 |
| 210 | 400 | 100 |
| 213 | 100 | 100 |
| 216 | 200 | 400 |
| 217 | | 400 |
| 218 | 200 | 200 |
| 219 | | 400 |

The compounds of Formula IIa and IIb have been shown to possess hypotensive, antimalarial, anthelmintic and Trichomonacidal activities. As representative of these various activities shown by these compounds are the following:

The Average Effective Dose$_{50}$ (AED$_{50}$( of 4-<N,N-bis-{3 - [4 - (N-methylcarbamyl) - 1-piperidyl]propyl} amino>-7-chloroquinoline, prepared above in Example 231 administered subcutaneously in the renal hypertensive rat, was found to be about 10 mg./kg.; the AED$_{50}$ of 4-{3 - [4 - (N,N-dimethylcarbamyl) - 1 - piperidyl]propyl-amino}-7-chloroquinoline, prepared above in Example 229, administered subcutnaeously in the renal hypertensive rat, was found to be 17.5 mg./kg.; 4-{3-[4-(N-methylcarbamyl)-1-piperidyl]propylamino}-7 - chloroquinoline, prepared above in Example 226 tested against various species of the malarial parasite Plasmodium, was found to be effective at a dose level of 25 mg./kg./day; 4-{3-[4-(N,N-dimethylcarbamyl)-1 - piperidyl]-propylamino} - 7-chloroquinoline, prepared above in Example 229, tested against the malarial parasite, *Plasmodium lophurae*, was found to be effective at a dose level of 10 mg./kg./day; and 4-[3-(4-carbamyl-1-piperidyl)propylamino]-7 - chloroquinoline, prepared above in Example 227, tested against various species of the malarial parasite, Plasmodium, was found to be effective at a dose level of 20 mg./kg./day; 4-[3-(4-carbamyl - 1 - piperidyl)propylamino]-7-chloroquinoline, prepared above in Example 227, administered to Swiss mice infected with nematode, *Syphacea obvelata*, and the tapeworm, *Hymenolepis nana*, cleared 80% of the animals of the infections in both cases at a dose level of 200 mg./kg./day; and 4-{3-[4-(N-methylcarbamyl)-1-piperidyl]propylamino}-7-chloroquinoline, prepared above in Example 226, administered to Swiss mice infected with the tapeworm, *Hymenolepis nana*, and the nemtaode, *Aspicularis tetraptera*, cleared 60% of the animals of the former infection and 70% of the animals of the latter infection at a dose level of 400 mg./kg./day.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

We claim:

1. A compound of the formula

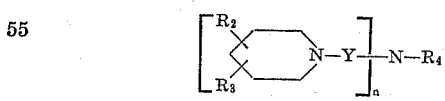

wherein R$_2$ is a member of the group consisting of unsubstituted - carbamyl, N-lower - alkylcarbamyl, N,N-di-lower-alkylcarbamyl, piperidinocarbonyl, pyrrolidinocarbonyl, hydroxy, hydroxy-lower-alkyl, lower-alkanoyl-amino, phenyl-lower-alkyl, and cycloalkyl-lower-alkyl; R$_3$ is a member of the group consisting of hydrogen and from one to five lower-alkyls; R$_4$ is a member of the group consisting of carbamyl, N-lower-alkylcarbamyl, N-cycloalkylcarbamyl, N,N-di-lower-alkylcarbamyl, N-phenylcarbamyl, piperidinocarbonyl, pyrrolidinocarbonyl, thiocarbamyl, N-lower-alkylthiocarbamyl, N,N-di-lower-alkylthiocarbamyl, N-phenylthiocarbamyl, piperidinothiocarbonyl, pyrrolidinothiocarbonyl and dicarbamylbiphenyl; Y is lower-alkylene; and n is the integers 1 and 2, the third valence on the amino nitrogen atom being attached to a hydrogen atom when n is 1.

2. A compound of the formula

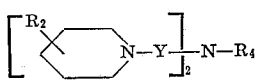

wherein $R_2$ is cycloalkyl-lower-alkyl; $R_4$ is N-cycloalkylcarbamyl; and Y is lower-alkylene.

3. A compound of the formula

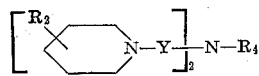

wherein $R_2$ is cycloalkyl-lower-alkyl; $R_4$ is N-phenylcarbamyl; and Y is lower-alkylene.

4. N - (N'-cyclohexylcarbamyl) - N,N-bis-[6-(4-cyclohexylmethyl-1-piperidyl)hexyl]amine.

5. N-(N'-phenylcarbamyl) - N,N-bis-[6-(4-cyclohexylmethyl-1-piperidyl)hexyl]amine.

References Cited

UNITED STATES PATENTS

| 2,203,504 | 6/1940 | Piggott et al. | 260—294 |
| 2,762,842 | 9/1956 | Hafliger et al. | 260—294 |
| 3,126,272 | 4/1964 | Fischer et al. | 260—294 |

OTHER REFERENCES

Theilheimer, Synthetic Methods of Organic Chemistry, vol. 8, Reactions 391 (p. 157); 533 (p. 211); 688 (p. 271), Karger, New York, 1954.

WALTER A. MODANCE, *Primary Examiner.*

AVROM D. SPEVACK, *Assistant Examiner.*

UNITED STATES PATENT OFFICE
CERTIFICATE OF CORRECTION

Patent No. 3,325,500                               June 13, 1967

Bernard L. Zenitz et al.

It is hereby certified that error appears in the above numbered patent requiring correction and that the said Letters Patent should read as corrected below.

Column 3, line 31, for "pehnoxy" read -- phenoxy --; line 68, for "cyanpropyl" read -- cyanopropyl --; column 6, lines 53 and 54, for "hydrogent" read -- hydrogen --; column 7, line 29, for "Formula" read -- Formula I --; column 9, line 59, for "hours" read -- hour --; column 10, line 3, for "crontonic" read -- crotonic --; lines 11 and 12, for "hydrochloric acid, hydrochloric acid, hydrobromic acid," read -- hydrochloric acid, hydrobromic acid, --; column 13, lines 28 and 29, for "6-aminophenylarsinate" read -- p-aminophenylarsinate --; line 53, for "rhodimum" read -- rhodium --; column 13 and 14, TABLE 3, sixth column, line 5 thereof, for "Isoproponal" read -- Isopropanol --; column 14, line 31, for "n is 21" read -- n is 2 --; column 18, line 24, for "Examples 123-134" read -- Examples 124-134 --; column 22, line 26, for "R is H" read -- $R_3$ is H --; columns 21 and 22, TABLE 10, opposite Example 166, third column, for "2HCl" read -- 3HCl --; column 26, line 29, for "(hexyl" read -- ) hexyl --; line 34, for "evaported" read -- evaporated --; line 44, for "Y is $(CH_1)_6$" read -- Y is $(CH_2)_6$ --; column 32, line 33, for "$ED_{59}$" read -- $ED_{50}$ --; column 33, line 14, for "The Average Effective $Dose_{50}$ ($AED_{50}$) of 4⊂N,N-" read -- The compounds of Formula I have also been shown to --; line 74, for "($AED_{50}$(" read -- ($AED_{50}$) --; column 34, line 29, for "nemtaode" read -- nematode --.

Signed and sealed this 17th day of June 1969.

(SEAL)
Attest:

EDWARD M. FLETCHER, JR.
Attesting Officer

WILLIAM E. SCHUYLER, JR.
                                            Commissioner of Patents